(12) United States Patent
Aoki et al.

(10) Patent No.: US 11,794,614 B2
(45) Date of Patent: Oct. 24, 2023

(54) CONVEYANCE SEAT

(71) Applicant: TS TECH CO., LTD., Saitama (JP)

(72) Inventors: Yuto Aoki, Tochigi (JP); Tadanori Masuda, Tochigi (JP); Kei Okuma, Tochigi (JP); Hidetsune Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/890,307

(22) Filed: Aug. 18, 2022

(65) Prior Publication Data

US 2022/0388431 A1 Dec. 8, 2022

Related U.S. Application Data

(63) Continuation of application No. 16/928,400, filed on Jul. 14, 2020, now Pat. No. 11,420,537.

(30) Foreign Application Priority Data

Jul. 17, 2019 (JP) .................................. 2019-132011

(51) Int. Cl.
*B60N 2/16* (2006.01)
*B60N 2/68* (2006.01)
*B60N 2/00* (2006.01)

(52) U.S. Cl.
CPC ........... *B60N 2/1615* (2013.01); *B60N 2/002* (2013.01); *B60N 2/68* (2013.01)

(58) Field of Classification Search
CPC ...... B60N 2/1615; B60N 2/1625; B60N 2/07; B60N 2/073
See application file for complete search history.

(56) References Cited

U.S. PATENT DOCUMENTS 6,276,650 B1 * 8/2001 Kojima ................ B60N 2/0715
248/421
7,360,460 B2 4/2008 Diehl et al.
(Continued)

FOREIGN PATENT DOCUMENTS

CN 113715699 A * 11/2021
DE 10239385 A1 3/2004
(Continued)

OTHER PUBLICATIONS

Japanese Office Action dated May 9, 2023 from the Japan Patent Office (JPO) for the related Japanese Patent Application No. 2019-132011, with English machine translation.

*Primary Examiner* — Timothy J Brindley
(74) *Attorney, Agent, or Firm* — Michael Best & Friedrich LLP

(57) ABSTRACT

A vehicle seat includes a seat cushion provided with a seat cushion frame, a front link configured to adjust a height of the seat cushion with respect to a base that is a slide rail or a vehicle body floor, and a front load detection sensor attached to an upper rail and configured to detect a load applied to the vehicle seat. The seat cushion frame includes a pair of side frames separated from each other in a seat width direction, the front link includes a first rotation shaft configured to be rotatable with respect to the seat cushion frame and a second rotation shaft configured to be rotatable with respect to the base, and the front load detection sensor is arranged at a position different from the second rotation shaft in a front to back direction of the seat.

20 Claims, 20 Drawing Sheets

(56) References Cited

U.S. PATENT DOCUMENTS

| | | |
|---|---|---|
| 7,597,011 B2 | 10/2009 | Krivtsov et al. |
| 7,762,150 B2 | 7/2010 | Kawabata et al. |
| 9,085,246 B1 * | 7/2015 | Pywell ..................... B60N 2/06 |
| 10,086,723 B1 * | 10/2018 | Watanabe ............ B60N 2/0705 |
| 2004/0108146 A1 | 6/2004 | Rundell et al. |
| 2011/0094317 A1 | 4/2011 | Aoyama et al. |
| 2011/0095580 A1 | 4/2011 | Inayoshi et al. |
| 2011/0098891 A1 | 4/2011 | Inayoshi et al. |
| 2013/0025377 A1 | 1/2013 | Ozawa et al. |
| 2013/0025378 A1 | 1/2013 | Ozawa et al. |
| 2014/0224041 A1 | 8/2014 | Ozawa et al. |
| 2014/0224553 A1 | 8/2014 | Ozawa |
| 2015/0035327 A1 * | 2/2015 | Ferenc ............... B60N 2/42709 |
| | | 297/216.1 |
| 2017/0246966 A1 | 8/2017 | Hayashi |
| 2017/0341530 A1 * | 11/2017 | Shinozaki .......... B60N 2/42736 |
| 2018/0272906 A1 | 9/2018 | Onuma et al. |
| 2018/0272909 A1 * | 9/2018 | Misono .................... B60N 2/70 |
| 2021/0170918 A1 * | 6/2021 | Kim ..................... B60N 2/3045 |

FOREIGN PATENT DOCUMENTS

| | | | |
|---|---|---|---|
| EP | 3674135 A1 * | 7/2020 | ............... B60N 2/06 |
| JP | 2003-127742 A | 5/2003 | |
| JP | 2009-036564 A | 2/2009 | |
| JP | 2017-154533 A | 9/2017 | |
| JP | 2018-199353 A | 12/2018 | |
| WO | WO-2012049725 A1 * | 4/2012 | ........... B60N 2/0705 |
| WO | 2013/021912 A1 | 2/2013 | |
| WO | WO-2017168102 A1 * | 10/2017 | ........... B60N 2/1615 |
| WO | WO-2020054678 A1 * | 3/2020 | ............... B60N 2/06 |

* cited by examiner

FIG. 4
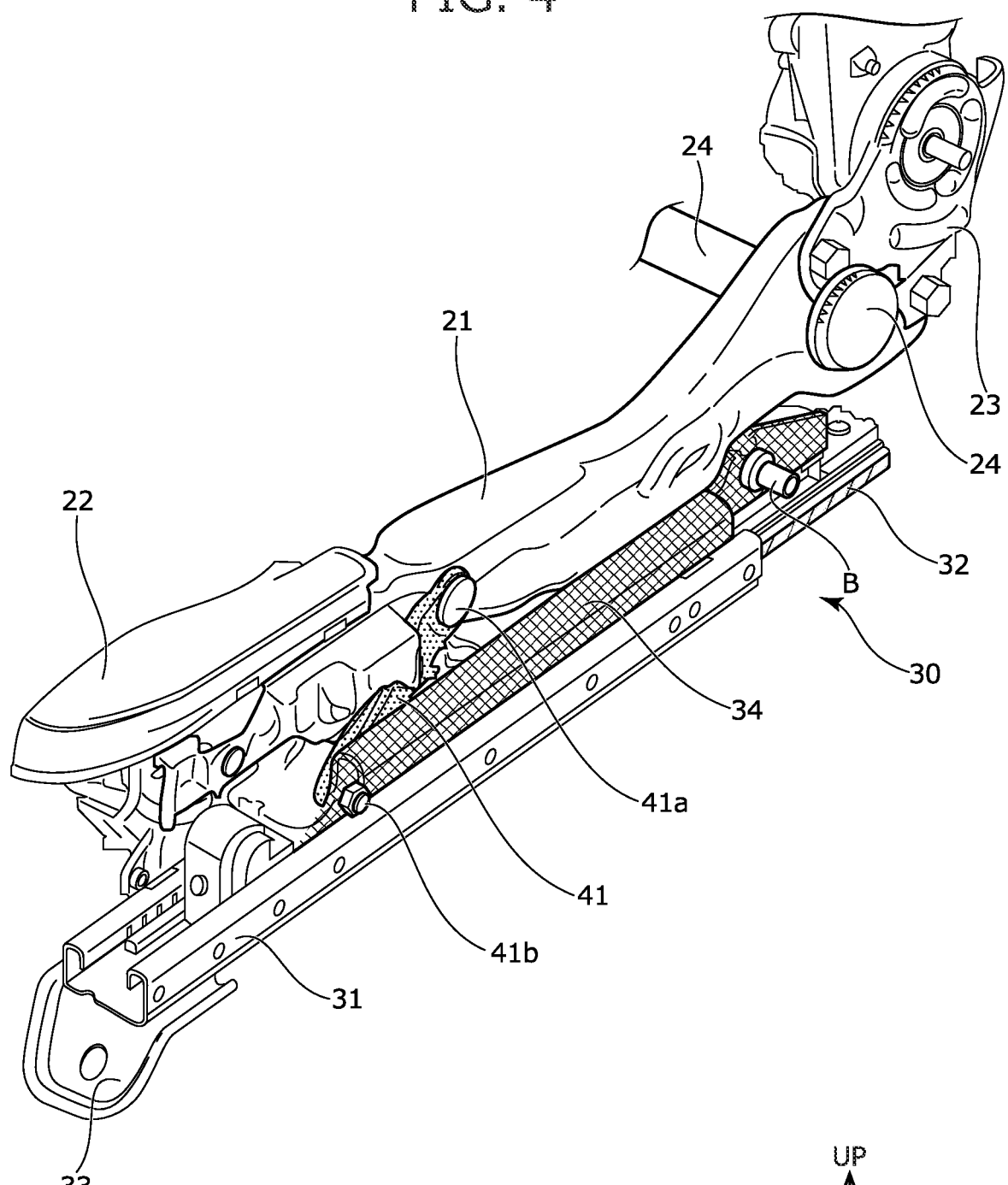
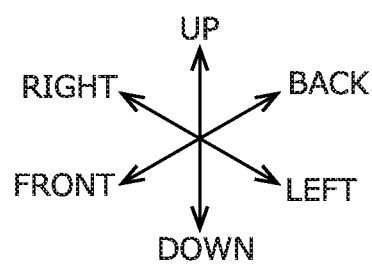

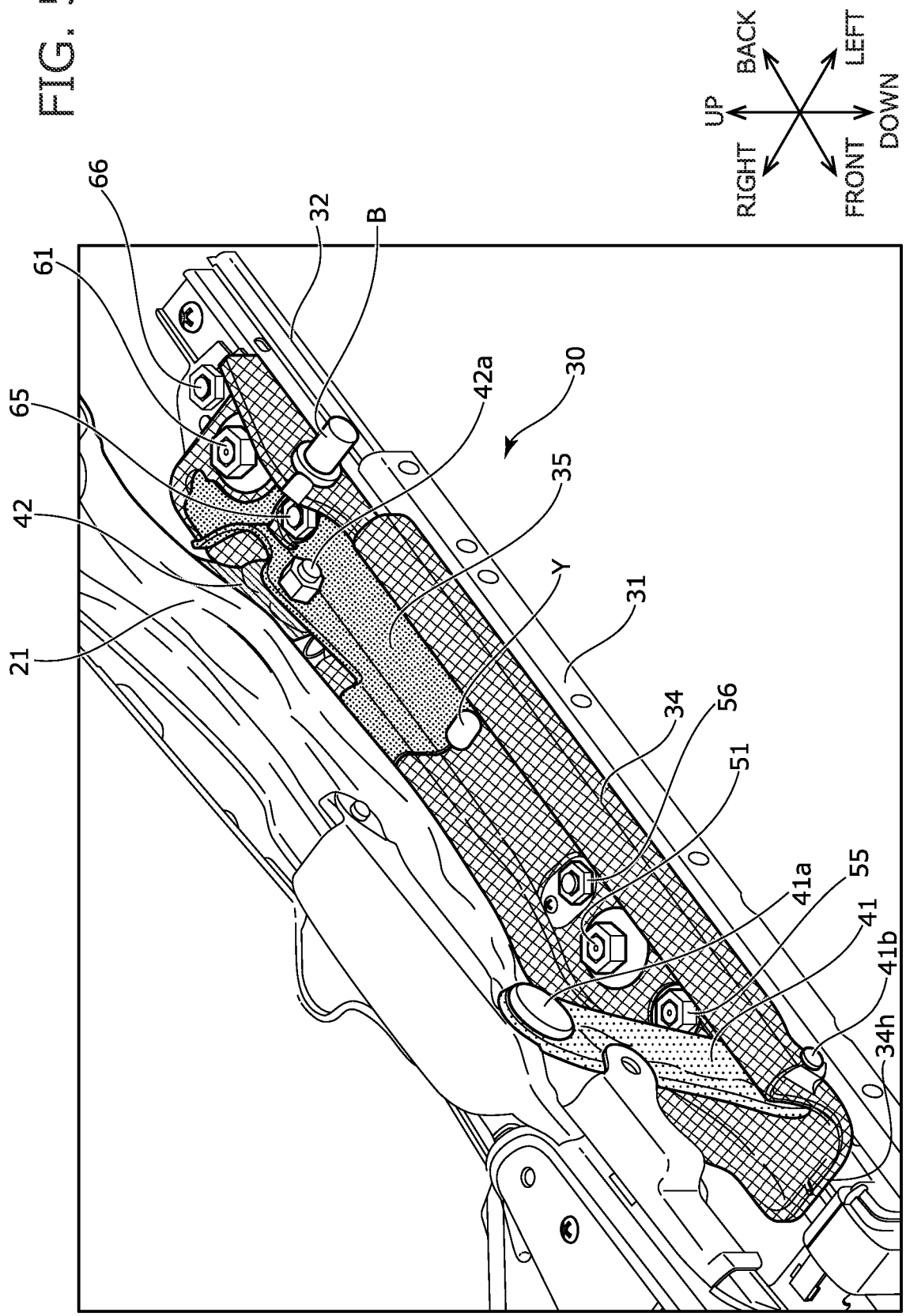

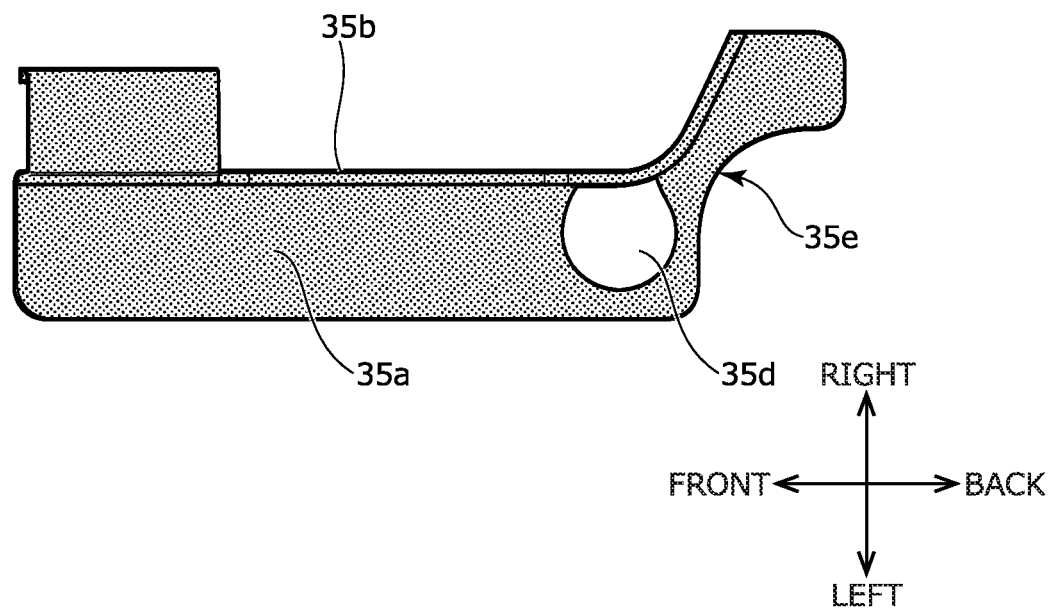
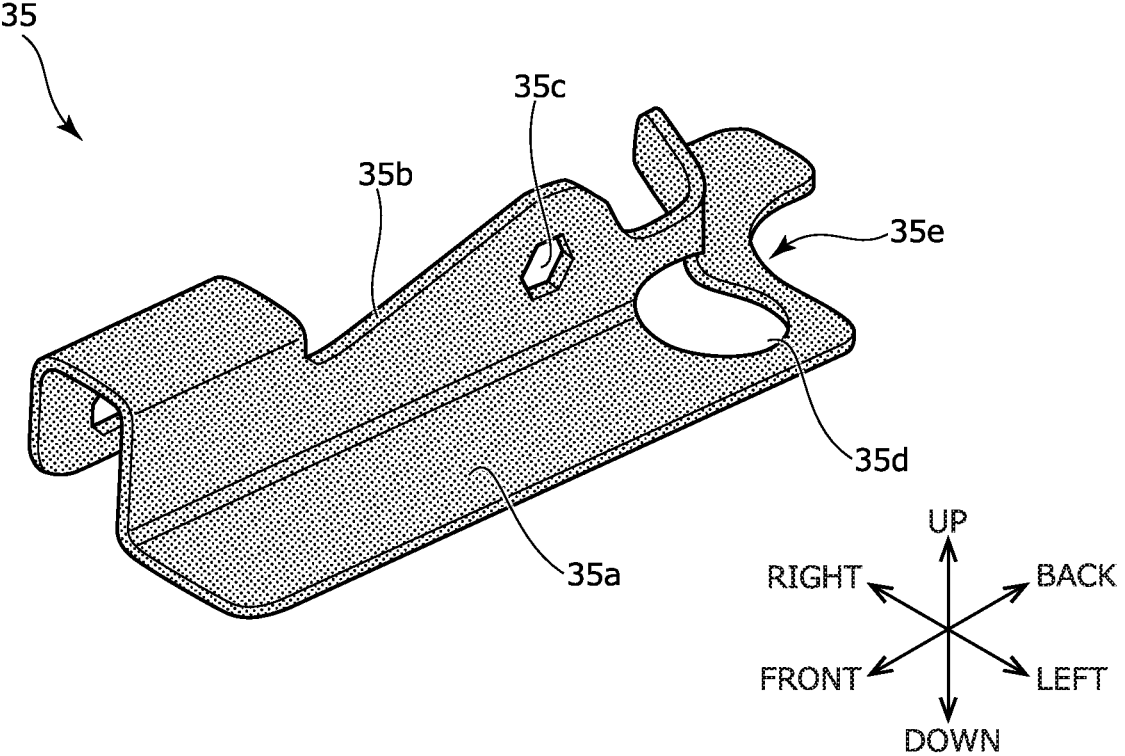

FIG. 15
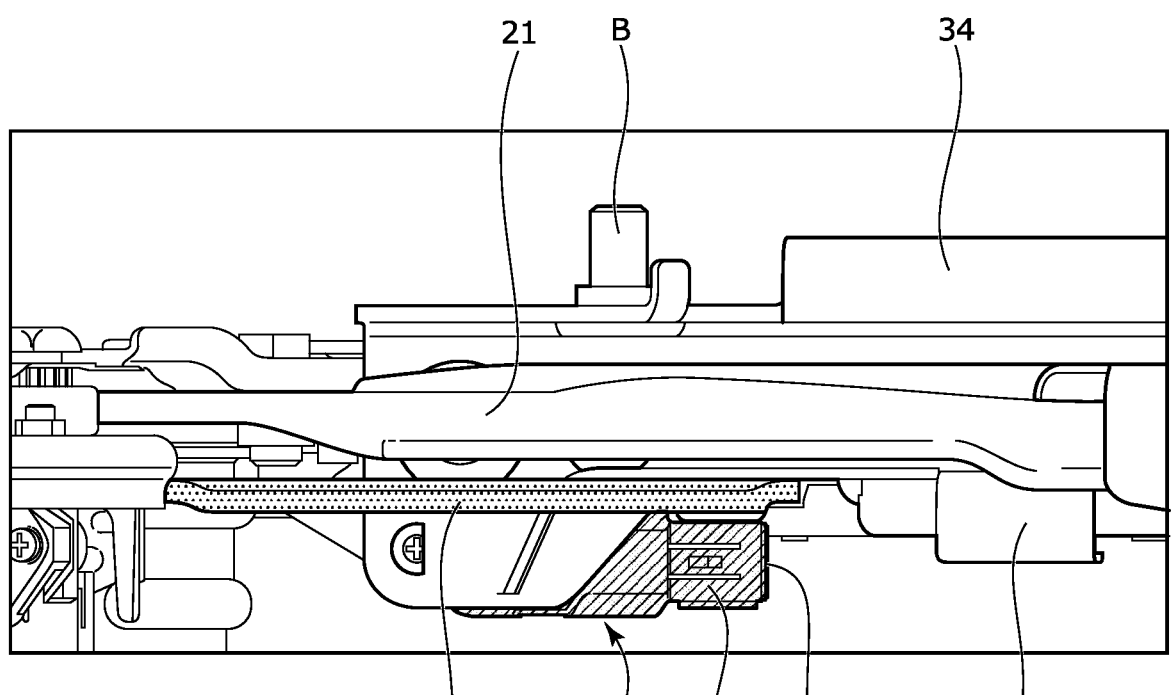
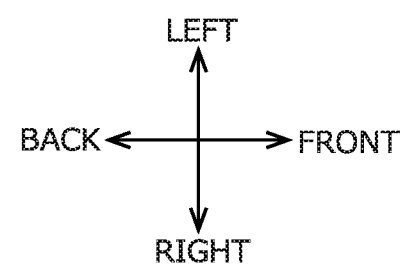

CONVEYANCE SEAT

CROSS REFERENCE TO RELATED APPLICATIONS

This application is a continuation of U.S. patent application Ser. No. 16/928,400 filed on Jul. 14, 2020. Further, this application is based on and claims the benefit of priority from the prior Japanese Patent Application JP 2019-132011, filed on Jul. 17, 2019, the entire contents of which are incorporated herein by reference.

BACKGROUND OF THE INVENTION

Field of the Invention

The present invention relates to a conveyance seat, and particularly to a vehicle seat including a height adjustment mechanism that adjusts a height of a seat cushion and a load detection device that detects the load of an occupant.

Description of the Related Art

A vehicle seat including a height adjustment mechanism that adjusts a height of a seat cushion and a load detection sensor that detects a load of an occupant is known (U.S. Pat. No. 7,360,460 and US Patent Application Publication No. 2014/0224553). The height adjustment mechanism is provided with a link member that is a rotating body that rotates to change the height of the seat cushion. The link member is interposed between the seat cushion and a slide rail mechanism, and rotates to move the seat cushion in an up to down direction.

In the vehicle seat described in U.S. Pat. No. 7,360,460 and US Patent Application Publication No. 2014/0224553, the load detection sensor includes a shaft member, and the load detection sensor is arranged to overlap with a rotation shaft of the link member provided in the height adjustment mechanism in a seat front to back direction of the vehicle seat, resulting in an increase in size in the up to down direction of the vehicle seat.

SUMMARY OF THE INVENTION

Therefore, the present invention has been made in view of the above problem, and an object thereof is to provide a conveyance seat including a height adjustment mechanism and a load detection sensor and preventing an increase in size.

The problem described above is solved by a conveyance seat according to an aspect of the present invention, the conveyance seat including: a seat cushion provided with a seat cushion frame; a first link member configured to adjust a height of the seat cushion with respect to a base that is a slide rail or a vehicle body floor; and a first load detection sensor attached to the base and configured to detect a load applied to the conveyance seat, wherein the seat cushion frame includes a pair of side frames separated from each other in a width direction of the conveyance seat, the first link member includes a first rotation shaft configured to be rotatable with respect to the seat cushion frame and a second rotation shaft configured to be rotatable with respect to the base, and the first load detection sensor is arranged at a position different from the second rotation shaft in a front to back direction of the conveyance seat.

In the conveyance seat according to the aspect of the present invention configured as described above, since the second rotation shaft of the first link member provided in a height adjustment mechanism is arranged at a position different from the first load detection sensor in the front to back direction of the seat, the conveyance seat is preventing from being increased in size in a height direction.

In the conveyance seat described above, the first load detection sensor may include a first sensor shaft to which the load applied to the conveyance seat is applied, and at least a part of the second rotation shaft may be arranged at the same height position as the first sensor shaft in an up to down direction of the conveyance seat.

In the configuration described above, since the second rotation shaft of the first link member and the first sensor shaft are arranged at the same height position, the conveyance seat is prevented from being increased in size in the height direction.

In the conveyance seat described above, an upper end of the second rotation shaft may be arranged below an upper end of the first sensor shaft in the up to down direction of the conveyance seat.

In the configuration described above, since the upper end of the second rotation shaft of the first link member is arranged below the upper end of the first sensor shaft, the conveyance seat is prevented from being increased in size in the height direction.

In the conveyance seat described above, the seat cushion frame may include a connecting member connecting the pair of side frames, and when the seat cushion is located at the lowest position, at least a part of the first load detection sensor may be arranged at the same height position as the connecting member in the up to down direction of the conveyance seat.

In the configuration described above, since the connecting member and the first load detection sensor are arranged at the same height position, the conveyance seat is prevented from being increased in size in the height direction.

In the conveyance seat described above, the conveyance seat may further include a second link member configured to adjust the height of the seat cushion with respect to the base at a position rearward of the first link member, wherein each of the side frames may be arranged between the first link member and the second link member in the width direction of the conveyance seat, and the first sensor shaft may be arranged between the first link member and the second link member in the width direction of the conveyance seat.

In the configuration described above, since the first sensor shaft is arranged between the first link member and the second link member in the seat width direction, the conveyance seat is prevented from being increased in size in the width direction.

In the conveyance seat described above, the conveyance seat may further include a second load detection sensor attached to the base and configured to detect the load applied to the conveyance seat, at a position rearward of the first load detection sensor, wherein the second load detection sensor may include a second sensor shaft to which the load applied to the conveyance seat is applied, and the second sensor shaft may be arranged between the first link member and the second link member in the width direction of the conveyance seat.

In the configuration described above, since the second sensor shaft is arranged between the first link member and the second link member in the seat width direction, the conveyance seat is prevented from being increased in size in the width direction.

In the conveyance seat described above, the conveyance seat may further include a second link member configured to adjust the height of the seat cushion with respect to the base at a position rearward of the first link member, and a second load detection sensor attached to the base and configured to detect the load applied to the conveyance seat, at a position rearward of the first load detection sensor, wherein the second load detection sensor may include a coupler for connecting to an external electronic device, and the second link member may be arranged between each of the side frames and the coupler in the width direction of the conveyance seat.

In the configuration described above, since the second link member is arranged between each of the side frames and the coupler in the seat width direction, the conveyance seat is prevented from being increased in size in the width direction.

In the conveyance seat described above, the coupler may be arranged at the same position as the second link member in the front to back direction of the conveyance seat.

In the configuration described above, the second link member and the coupler are compactly arranged in the front to back direction of the seat.

In the conveyance seat described above, the conveyance seat may further include a second link member configured to adjust the height of the seat cushion with respect to the base at a position rearward of the first link member, and a second load detection sensor attached to the base and configured to detect the load applied to the conveyance seat, at a position rearward of the first load detection sensor, wherein the first link member and the second link member may be attached to a link support bracket, the first load detection sensor and the second load detection sensor may be attached to the link support bracket, and the link support bracket may be bent upward and is separated from the base between an attachment position of the first load detection sensor and an attachment position of the second load detection sensor.

In the configuration described above, the number of components constituting the conveyance seat is reduced, and the rigidity of the link support bracket itself is increased.

In the conveyance seat described above, the conveyance seat may further include a plate-shaped pressure receiving member suspended on the seat cushion frame, a recessed portion recessed inward and formed at a side portion of the pressure receiving member in the width direction of the conveyance seat, and a second load detection sensor attached to the base and configured to detect the load applied to the conveyance seat, at a position rearward of the first load detection sensor, wherein the recessed portion may be arranged between the first load detection sensor and the second load detection sensor in the front to back direction of the conveyance seat.

In the configuration described above, since the recess of the pressure receiving member is compactly arranged in the front to back direction of the seat, the rigidity of the pressure receiving member is prevented from being reduced.

According to a conveyance seat of the present invention, since the second rotation shaft of the first link member provided in a height adjustment mechanism is arranged at a position different from the first load detection sensor in the front to back direction of the seat, the conveyance seat is preventing from being increased in size in a height direction.

Further, according to a conveyance seat of the present invention, since the second rotation shaft of the first link member and the first sensor shaft are arranged at the same height position, the conveyance seat is prevented from being increased in size in the height direction.

Further, according to a conveyance seat of the present invention, since the upper end of the second rotation shaft of the first link member is arranged below the upper end of the first sensor shaft, the conveyance seat is prevented from being increased in size in the height direction.

Further, according to a conveyance seat of the present invention, since the connecting member and the first load detection sensor are arranged at the same height position, the conveyance seat is prevented from being increased in size in the height direction.

Further, according to a conveyance seat of the present invention, since the first sensor shaft is arranged between the first link member and the second link member in the seat width direction, the conveyance seat is prevented from being increased in size in the width direction.

Further, according to a conveyance seat of the present invention, since the second sensor shaft is arranged between the first link member and the second link member in the seat width direction, the conveyance seat is prevented from being increased in size in the width direction.

Further, according to a conveyance seat of the present invention, since the second link member is arranged between each of the side frames and the coupler in the seat width direction, the conveyance seat is prevented from being increased in size in the width direction.

Further, according to a conveyance seat of the present invention, the second link member and the coupler are compactly arranged in the front to back direction of the seat.

Further, according to a conveyance seat of the present invention, the number of components constituting the conveyance seat is reduced, and the rigidity of the link support bracket itself is increased.

Further, according to a conveyance seat of the present invention, since the recess of the pressure receiving member is compactly arranged in the front to back direction of the seat, the rigidity of the pressure receiving member is prevented from being reduced.

BRIEF DESCRIPTION OF THE DRAWINGS

FIG. 4 is a schematic perspective view of the seat cushion frame of the vehicle seat when viewed from the outside.

FIG. 5 is an enlarged view showing a slide rail of the vehicle seat and its vicinity.

FIG. 7A is a top view of a second link support bracket.

FIG. 7B is a perspective view of the second link support bracket.

FIG. 15 is a top view showing the rear end portion of the seat cushion frame.

DETAILED DESCRIPTION

Hereinafter, a conveyance seat according to an embodiment of the present invention (hereinafter, the present embodiment) will be described. As an example of the conveyance seat according to the present embodiment, a vehicle seat mounted on a vehicle will be described, but the present invention is not limited to the vehicle seat.

The embodiments described below are merely examples for facilitating the understanding of the present invention, and do not limit the present invention. That is, the shapes, dimensions, arrangements, and the like of the members described below can be changed and improved without departing from the spirit of the present invention, and the present invention, of course, includes equivalents thereof.

In the following description, the phrase "front to back direction" indicates a front to back direction of the vehicle seat, and is a direction that corresponds to the front to back direction when viewed from a seated person of the vehicle seat, that is, a traveling direction of a vehicle. Further, the phrase "seat width direction" indicates a width direction of the vehicle seat, and corresponds to a right and left direction when viewed from the seated person of the vehicle seat. The phrase "height direction" indicates a height direction of the vehicle seat, and corresponds to a direction perpendicular to both the front to back direction and the seat width direction, that is, an up to down direction.

<Basic Configuration of Vehicle Seat S>

Figure 1:
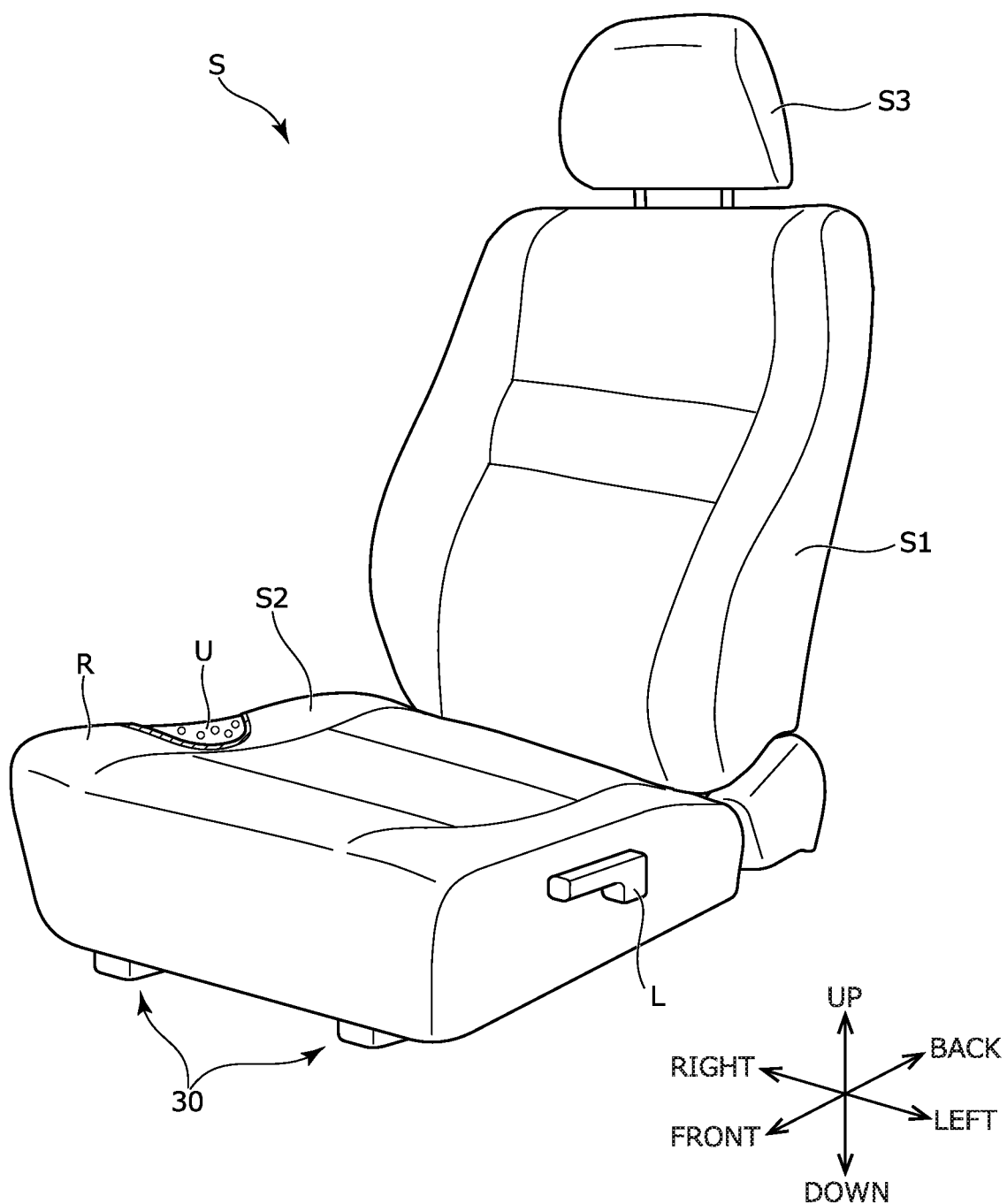
FIG. 1 is an external view of a vehicle seat according to an embodiment of the present invention.

The basic configuration of a vehicle seat S according to the present embodiment will be described. The basic configuration of the vehicle seat S according to the present embodiment is substantially the same as that of a known general vehicle seat, and includes a seat back S1, a seat cushion S2, and a headrest S3 as shown in FIG. 1. In FIG. 1, the configuration of a part of the vehicle seat S, specifically, the right center portion of the seat cushion S2 is shown with a skin material R removed for convenience of description.

Figure 2:
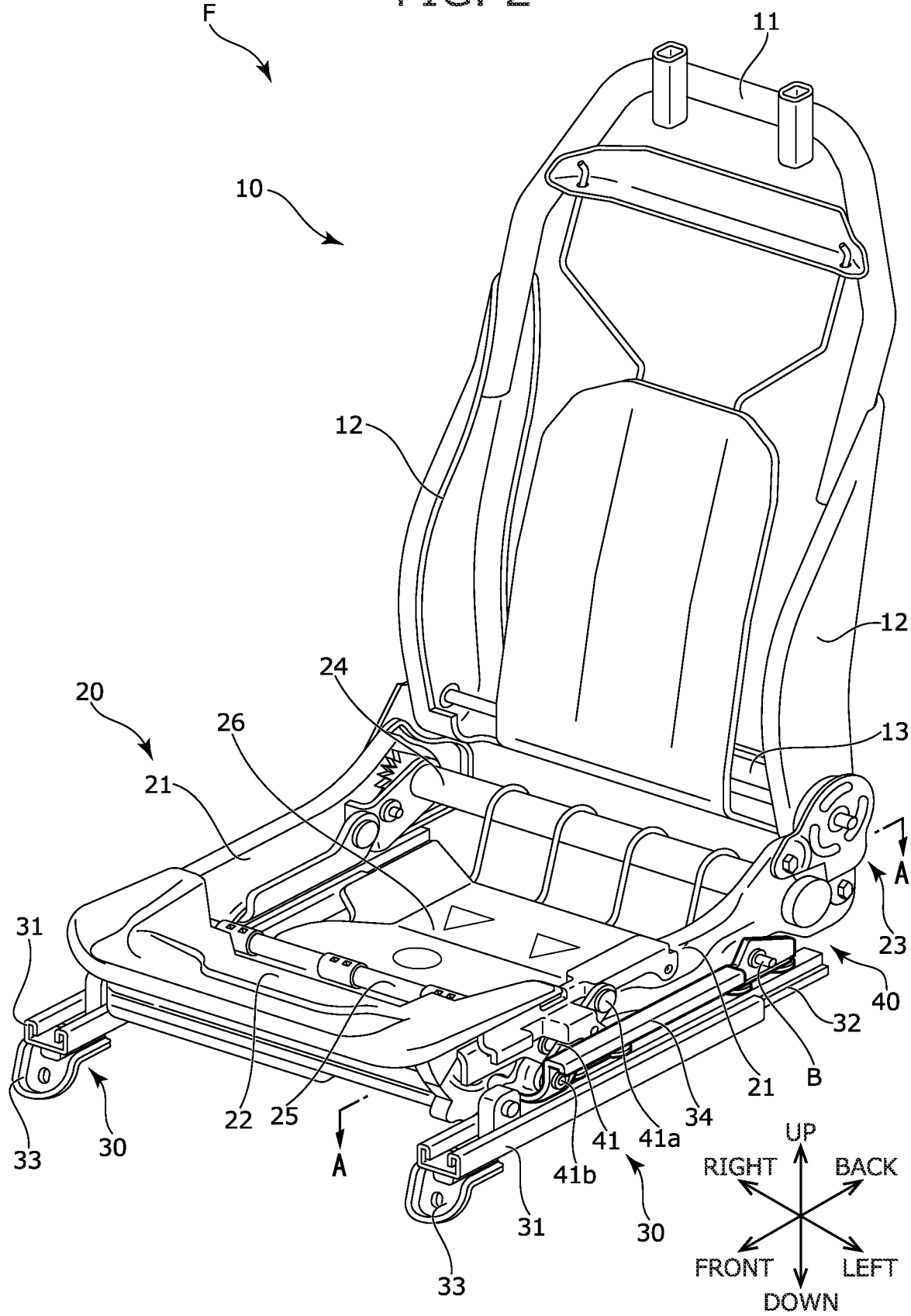
FIG. 2 is a perspective view of a seat frame provided in the vehicle seat according to the embodiment of the present invention.

The vehicle seat S includes a seat frame F as its framework shown in FIG. 2. The seat frame F includes a seat back frame 10 and a seat cushion frame 20 as main components. The seat back S1 and the seat cushion S2 are configured such that cushion pads U made of urethane or the like are placed on respective frames (the seat back frame 10 and the seat cushion frame 20) and surfaces of the cushion pads U are covered with the skin material R.

Further, slide rail mechanisms 30 for sliding the seat back S1, the seat cushion S2, and the headrest S3 in the front to back direction are arranged below the seat cushion S2. As shown in FIG. 1, a pair of right and left slide rail mechanisms 30 is provided with a gap therebetween. As shown in FIG. 2, each of the slide rail mechanisms 30 includes a lower rail 31 that is fixed to a vehicle body so as to extend in the front to back direction, and an upper rail 32 that is movable in an extending direction of the lower rail 31.

Furthermore, a height adjustment mechanism 40 for adjusting a height of the seat cushion S2 is provided between the seat cushion S2 and the slide rail mechanisms in the height direction. An operating lever L for driving the height adjustment mechanism 40 is provided at the side of the seat cushion S2.

(Seat Back Frame 10)

As shown in FIG. 2, the seat back frame 10 includes an inverted U-shaped upper frame 11, a pair of right and left seat back side frames 12 forming opposite end portions in the seat width direction, and a lower member frame 13 disposed between lower end portions of the seat back side frames 12. A reclining mechanism (not shown) that adjusts an inclination angle of the seat back S1 with respect to the seat cushion S2 is attached to the lower end portion of one seat back side frame 12 of the pair of right and left seat back side frames 12.

(Seat Cushion Frame 20)

As shown in FIG. 2, the seat cushion frame 20 has a rectangular frame-shaped outer shape when viewed from above, and includes seat cushion side frames 21 (corresponding to side frames) located at opposite end portions in the seat width direction, and a pan frame 22 constituting a front end portion of the seat cushion frame 20 as main components. Further, connecting brackets 23 are attached to upper portions of the rear end portions of the seat cushion side frames 21. The connecting brackets 23 are metal plate members provided to connect the seat cushion side frames 21 and the seat back side frames 12.

Each of the seat cushion side frames 21 is made of metal steel plate extending in the front to back direction. Further, each of the seat cushion side frames 21 is located directly above the corresponding slide rail mechanism 30 (the slide rail mechanism 30 located closer to the each of the seat cushion side frames 21).

As shown in FIG. 2, the rear end portions of the pair of right and left seat cushion side frames 21 are connected to each other through a rear side connecting pipe 24. The rear side connecting pipe 24 is formed of a round pipe extending in the seat width direction. Furthermore, as shown in FIG. 2, the front end portions of the pair of right and left seat cushion side frames 21 are connected to each other through a front side connecting pipe 25. The front side connecting pipe 25 is formed of a round pipe extending in the seat width direction.

Each of the rear side connecting pipe 24 and the front side connecting pipe 25 is arranged between the seat cushion side frames 21, and the end portions thereof are joined to the seat cushion side frames 21 so as to extend through the seat cushion side frames 21.

Figure 3:
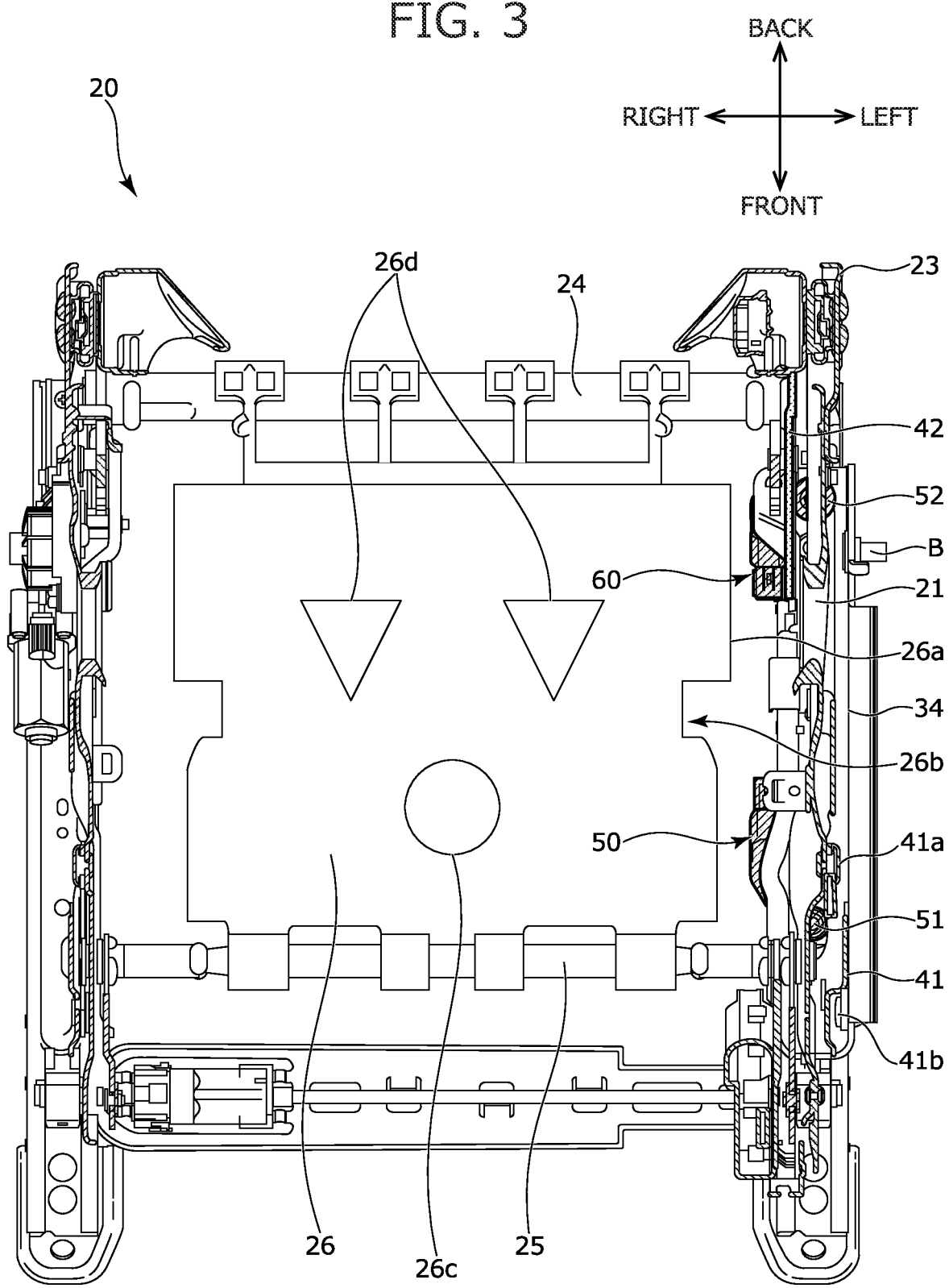
FIG. 3 is a partial cross-sectional view of a seat cushion frame of the vehicle seat when viewed from above.

As shown in FIGS. 2 and 3, a plate-shaped pressure receiving member 26 is suspended between the rear side connecting pipe 24 and the front side connecting pipe 25 of the seat cushion frame 20. In the pressure receiving member 26, a recessed portion 26b recessed inward is formed at a side portion 26a in the seat width direction. As shown in FIG. 3, in a front part of the pressure receiving member 26, one round hole 26c is formed at a substantially central position in the seat width direction. Further, in a rear part of the pressure receiving member 26, two triangular holes 26d are formed side by side in the seat width direction. Instead of the pressure receiving member 26, the pan frame 22 may extend to the rear side connecting pipe 24.

(Slide Rail Mechanism 30)

The slide rail mechanism 30 includes the lower rail 31 and the upper rail 32, as well as, a foot 33, a first link support bracket 34, and a second link support bracket 35 (FIGS. 4 and 5). The foot 33 is a member attached to a front end portion of the lower rail 31 in order to fix the lower rail 31 to the vehicle body.

A pair of right and left first link support brackets and a pair of right and left second link support brackets 35, which serve as link support brackets, are each provided so as to be separated from each other in the seat width direction, and are metal plate members that support rotation links (specifically, front links 41 and rear links 42 to be described later) provided in the height adjustment mechanism 40 (FIGS. 4 to 7B).

(First Link Support Bracket 34)

Figure 6A:
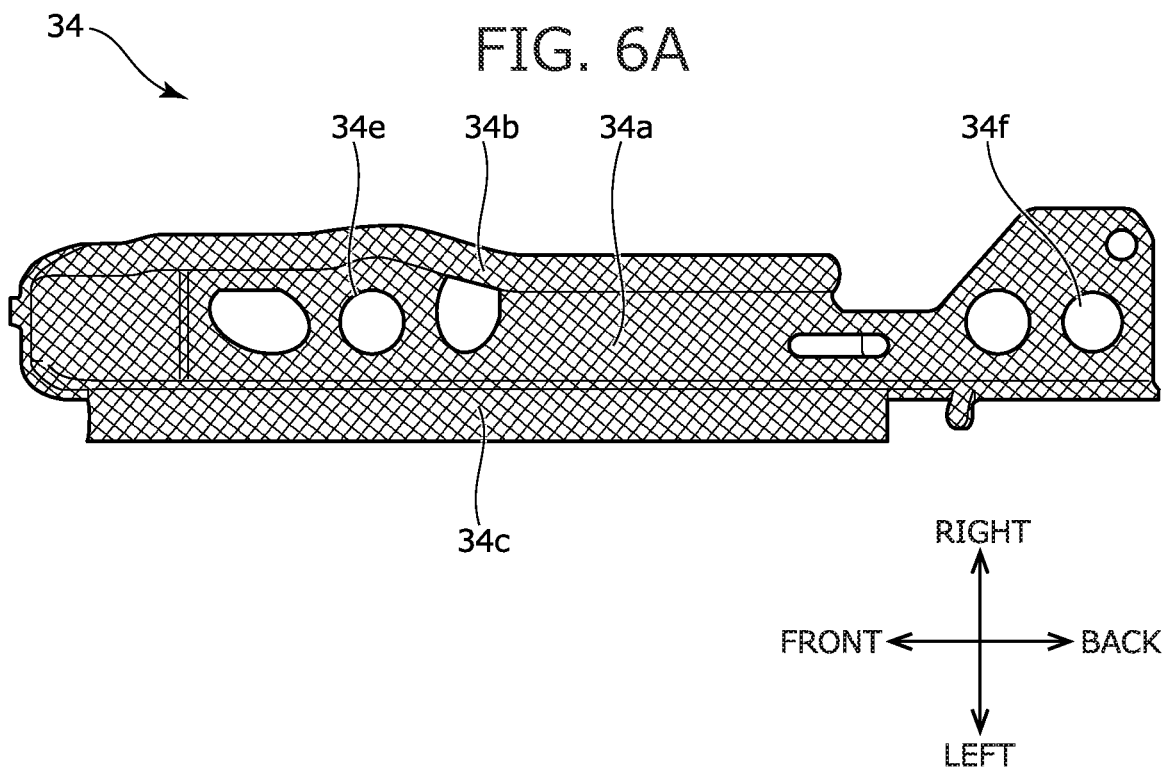
FIG. 6A is a top view of a first link support bracket.
Figure 6B:
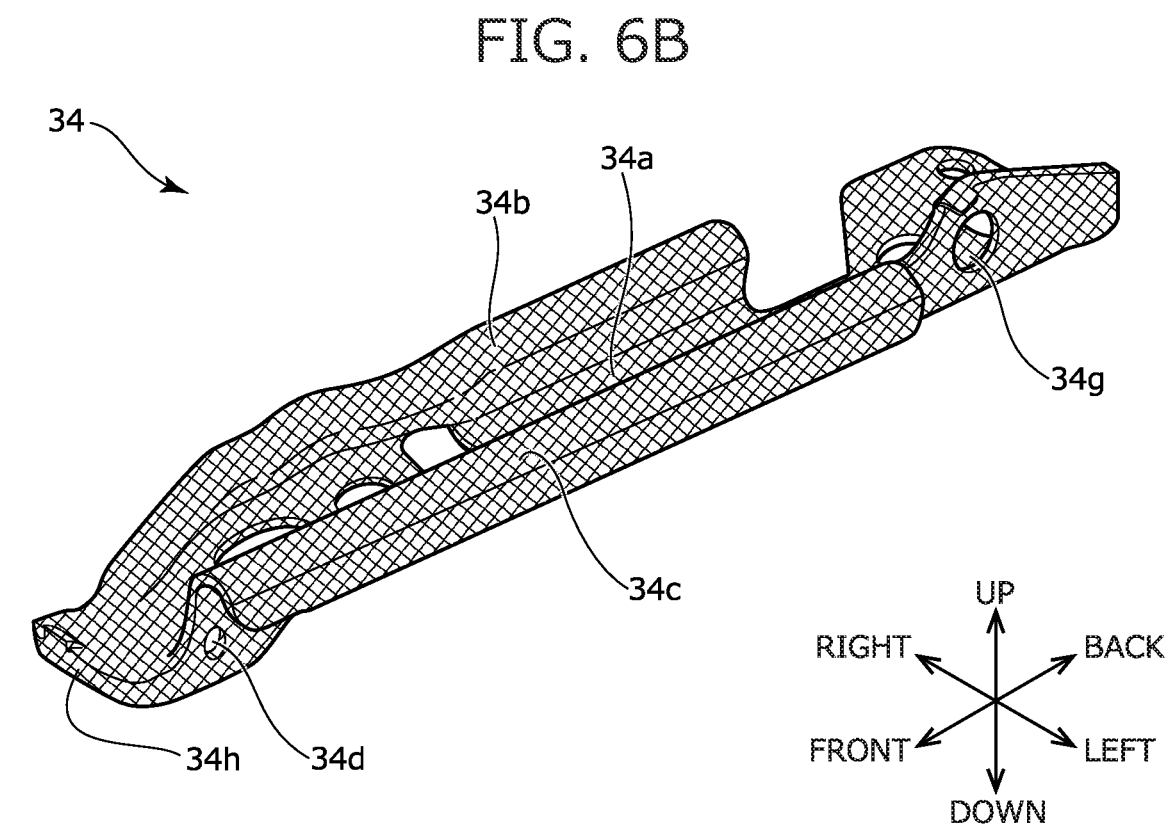
FIG. 6B is a perspective view of the first link support bracket.

The first link support bracket 34 extends long in the front to back direction and is fixed to an upper surface of the upper rail 32 via a front load detection sensor 50 and a rear load detection sensor 60. As shown in FIGS. 5, 6A and 6B, the first link support bracket 34 includes a bottom wall 34a to which the front load detection sensor 50 and the rear load detection sensor 60 are attached, and an inner wall 34b and an outer wall 34c that are provided to stand from the bottom wall 34a.

As shown in FIG. 6B, the inner wall 34b of the first link support bracket 34 is bent inward in the seat width direction. Further, as shown in FIGS. 5 and 6B, the outer wall 34c of the first link support bracket 34 is bent in an inverted U shape outward in the seat width direction. Further, a front link hole 34d is formed at a front end portion of the outer wall 34c of the first link support bracket 34 so as to correspond to a second rotation shaft 41b at a lower end portion of the front link 41 to be described later.

A first shaft hole 34e is formed in a front part of the bottom wall 34a of the first link support bracket 34 so as to correspond to a first sensor shaft 51 of the front load detection sensor 50 to be described later. Further, a second shaft hole 34f is formed in a rear part of the bottom wall 34a of the first link support bracket 34 so as to correspond to a second sensor shaft 61 of the rear load detection sensor 60 to be described later (FIGS. 5 and 6A). Further, a rear hole 34g is formed at a rear end portion of the outer wall 34c of the first link support bracket 34 so as to correspond to a buckle support bracket attachment portion B of a seat belt to be described later.

(Second Link Support Bracket 35)

The second link support bracket 35 is arranged at a rear end of the first link support bracket 34, and is fixed to the upper surface of the upper rail 32 via the rear load detection sensor 60. As shown in FIGS. 5, 7A and 7B, the second link support bracket 35 includes a bottom wall 35a to which the rear load detection sensor 60 is attached, and an inner wall 35b provided to stand from the bottom wall 35a.

As shown in FIG. 7B, a front portion of the inner wall 35b of the second link support bracket 35 is bent inward in the seat width direction and is fitted to the inner wall 34b of the first link support bracket 34. Further, as shown in FIG. 7B, a rear link hole 35c is formed in a rear part of the inner wall 35b of the second link support bracket 35 so as to correspond to a rear link rotation shaft 42a of the rear link 42 to be described later.

A nut hole 35d is formed in the bottom wall 35a of the second link support bracket 35 so as to correspond to a nut at a front part of the rear load detection sensor 60 to be described later (FIGS. 5, 7A, and 7B). Further, at a rear end portion of the bottom wall 35a of the second link support bracket 35, a notched portion 35e is formed to be recessed inward in the seat width direction so as to correspond to the second sensor shaft 61 of the rear load detection sensor 60 to be described later.

Figure 10A:
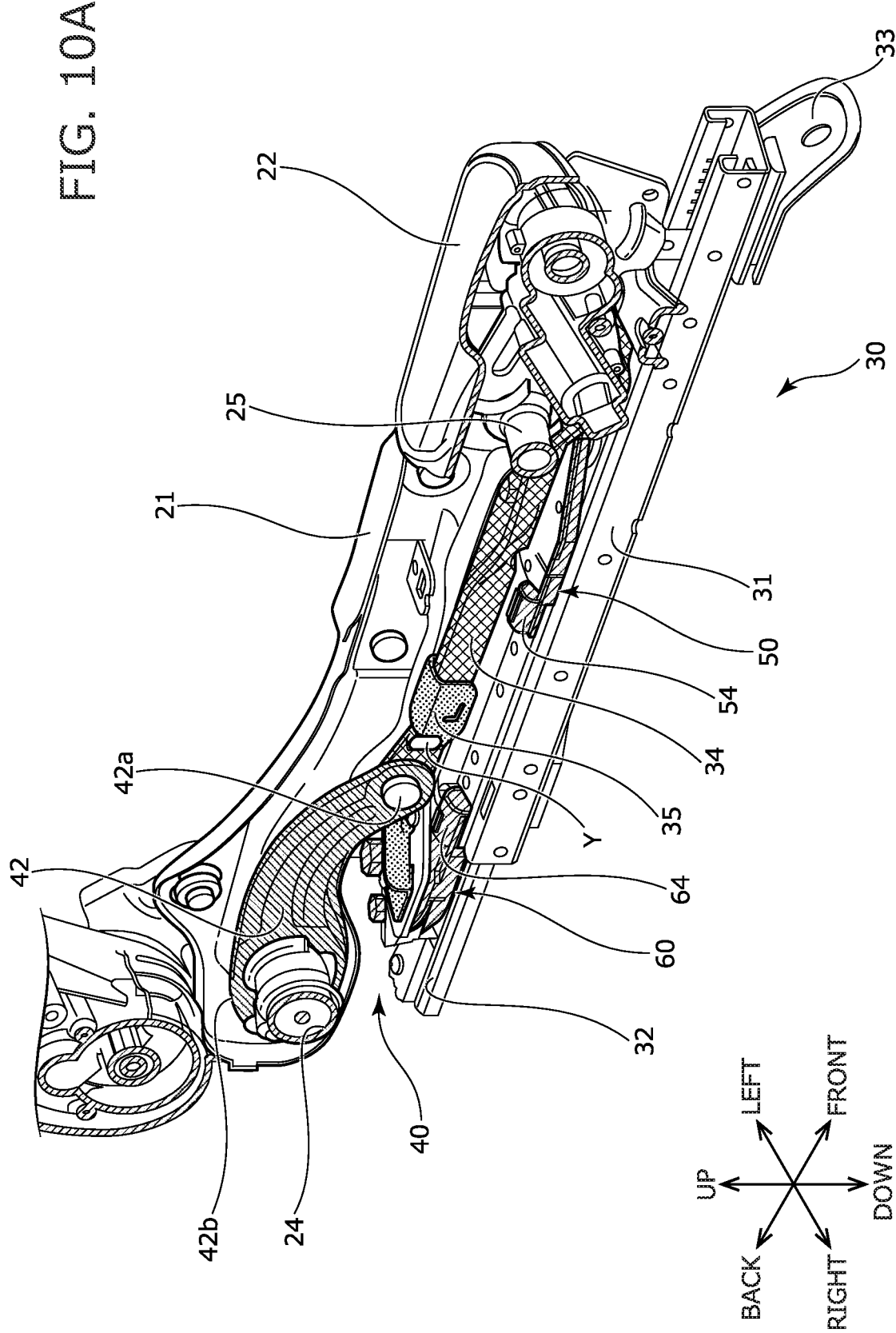
FIG. 10A is a schematic perspective view of the seat cushion frame of the vehicle seat when viewed from the inside.
Figure 10B:
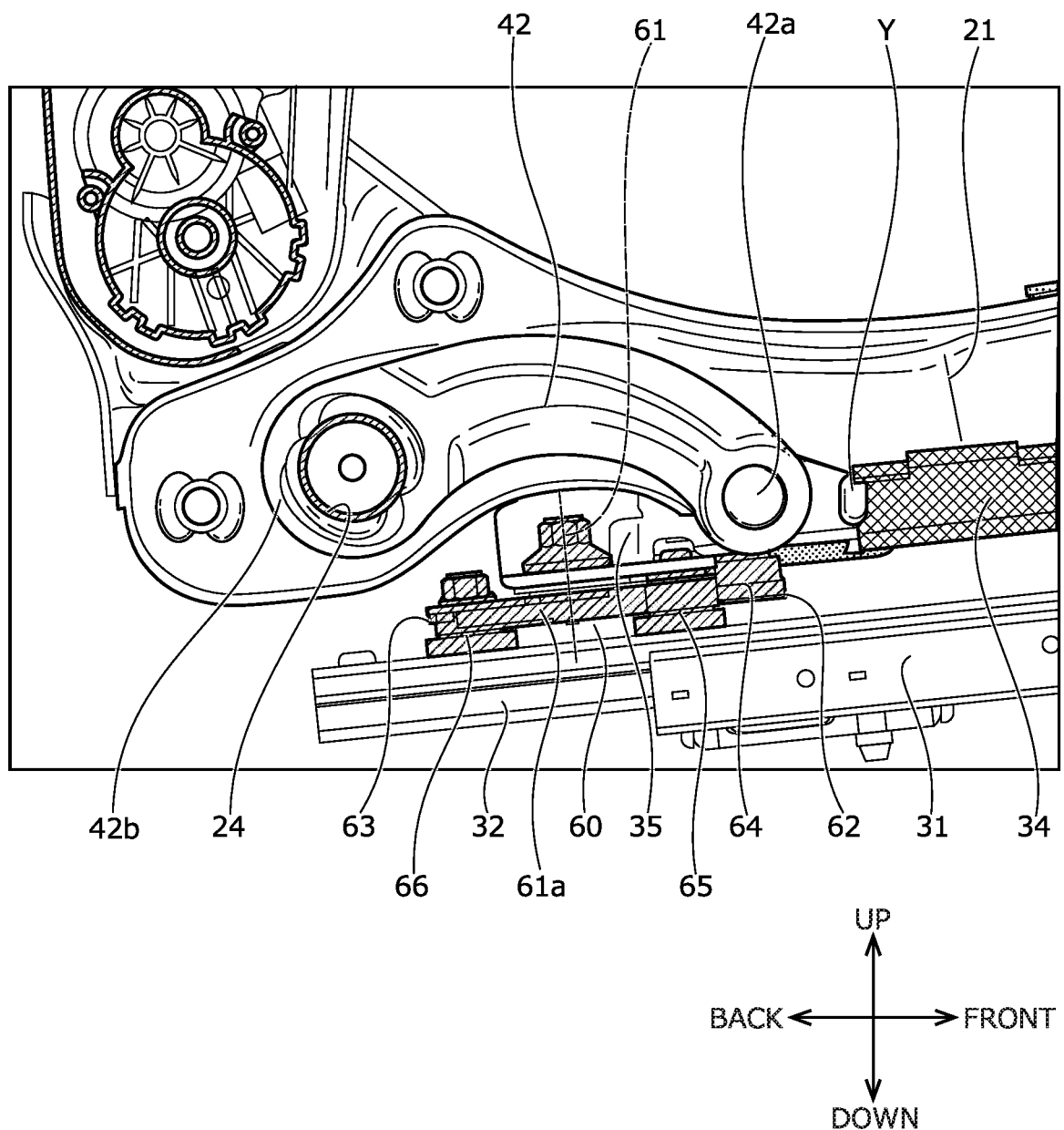
FIG. 10B is a side view showing a rear end portion of the seat cushion frame of the vehicle seat.
Figure 11A:
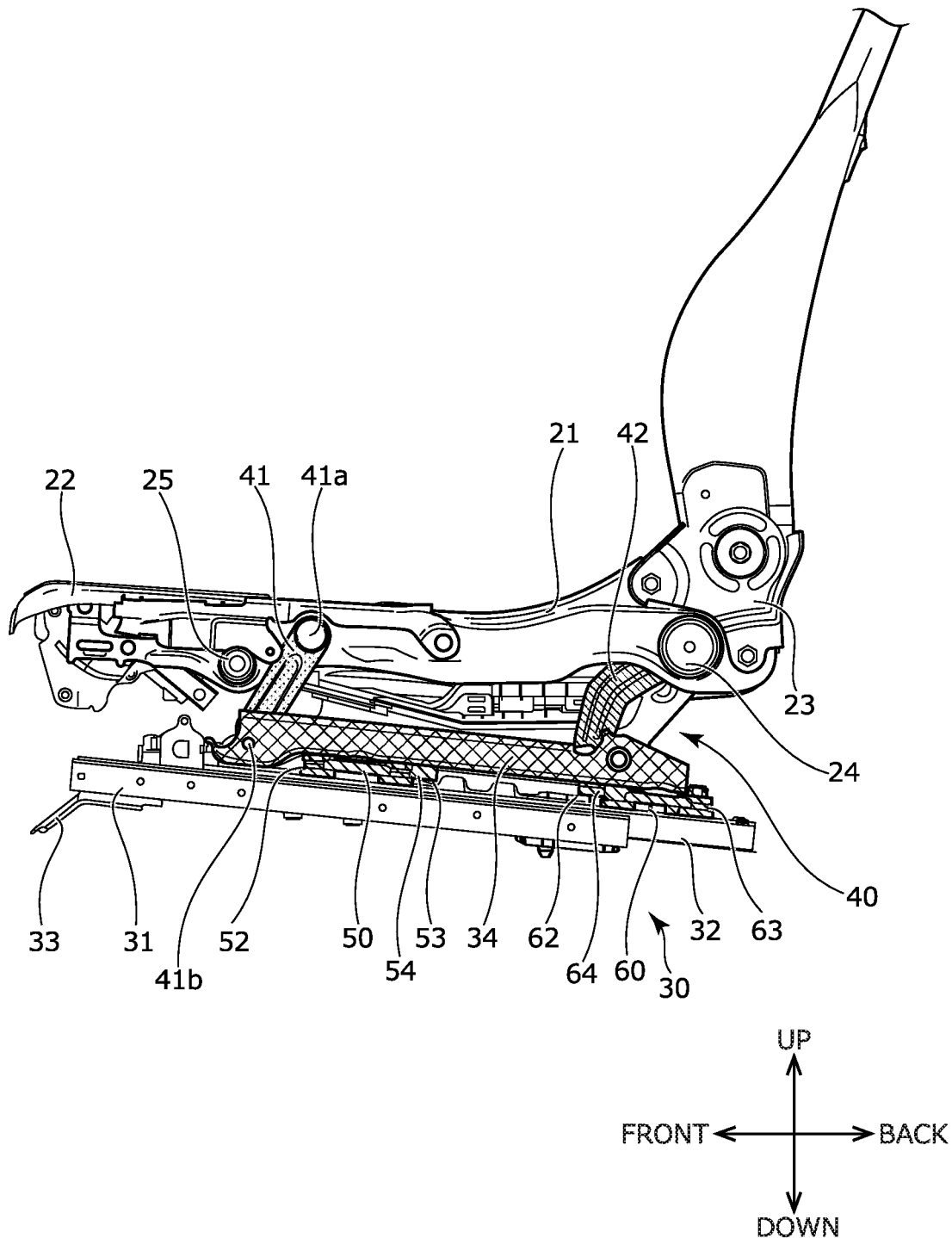
FIG. 11A is a side view of the seat frame when a seat cushion of the vehicle seat is located at the uppermost position.
Figure 11B:
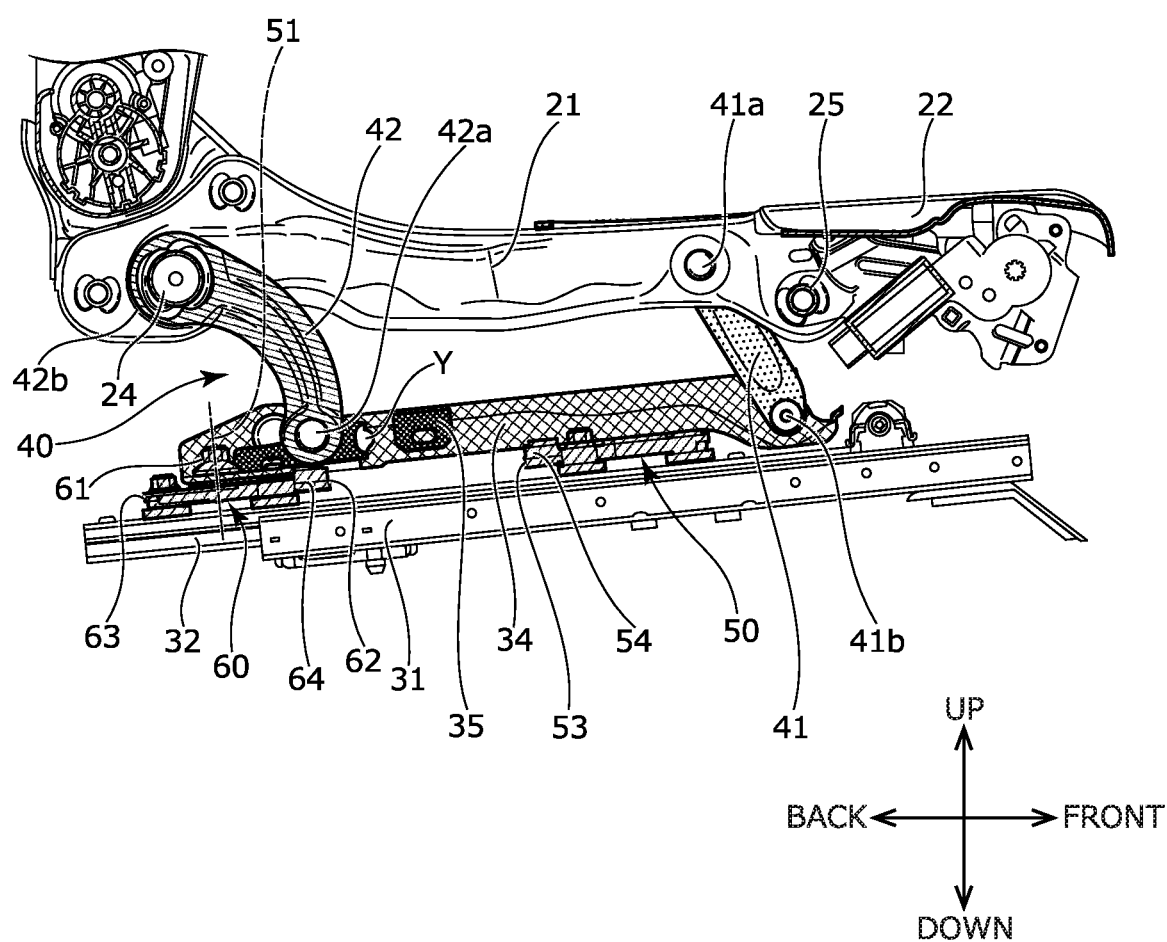
FIG. 11B is a schematic side view of the seat frame when the seat cushion of the vehicle seat is located at the uppermost position, when viewed from the inside.
Figure 12A:
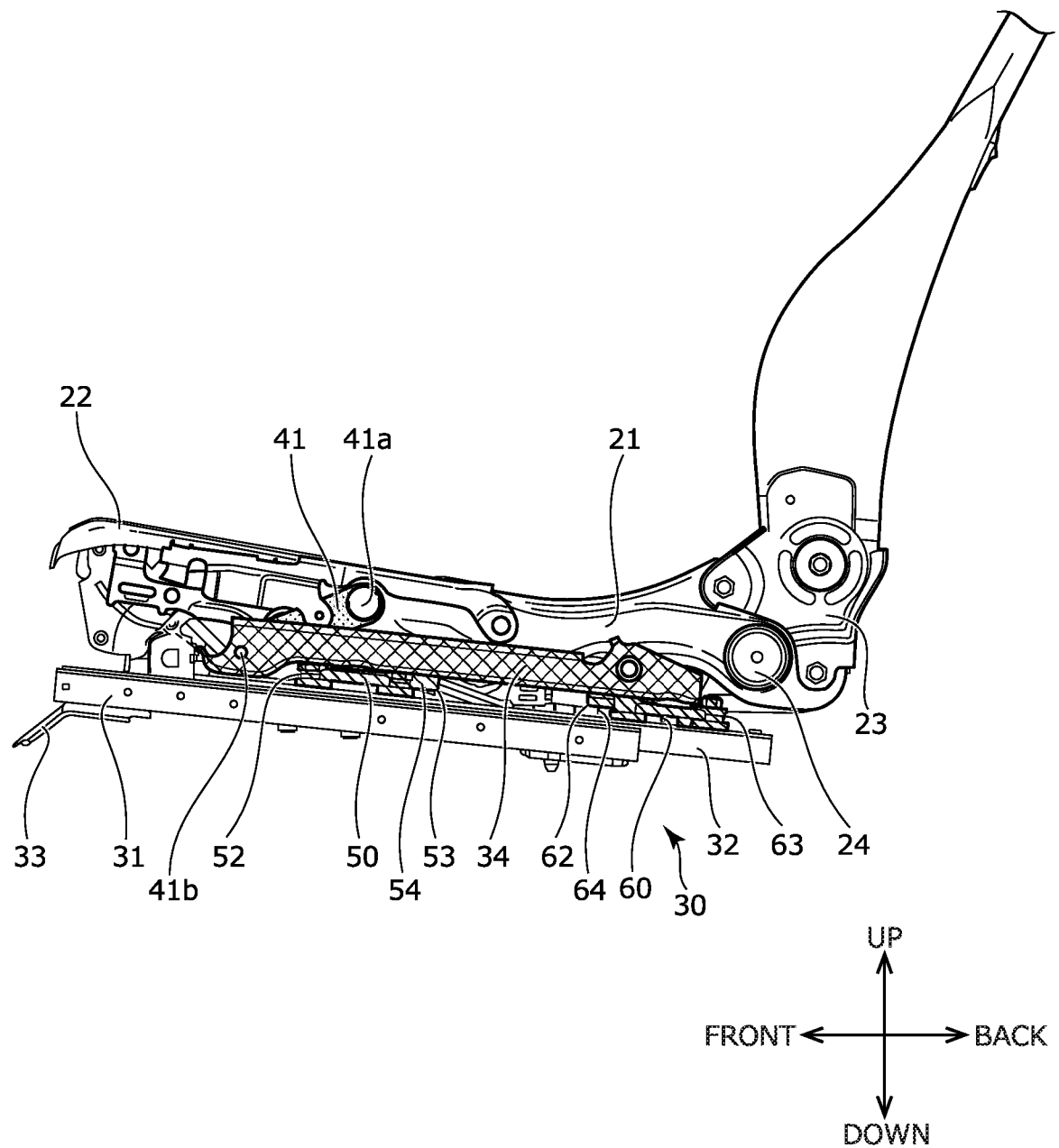
FIG. 12A is a side view of the seat frame when the seat cushion of the vehicle seat is located at the lowermost position.
Figure 12B:
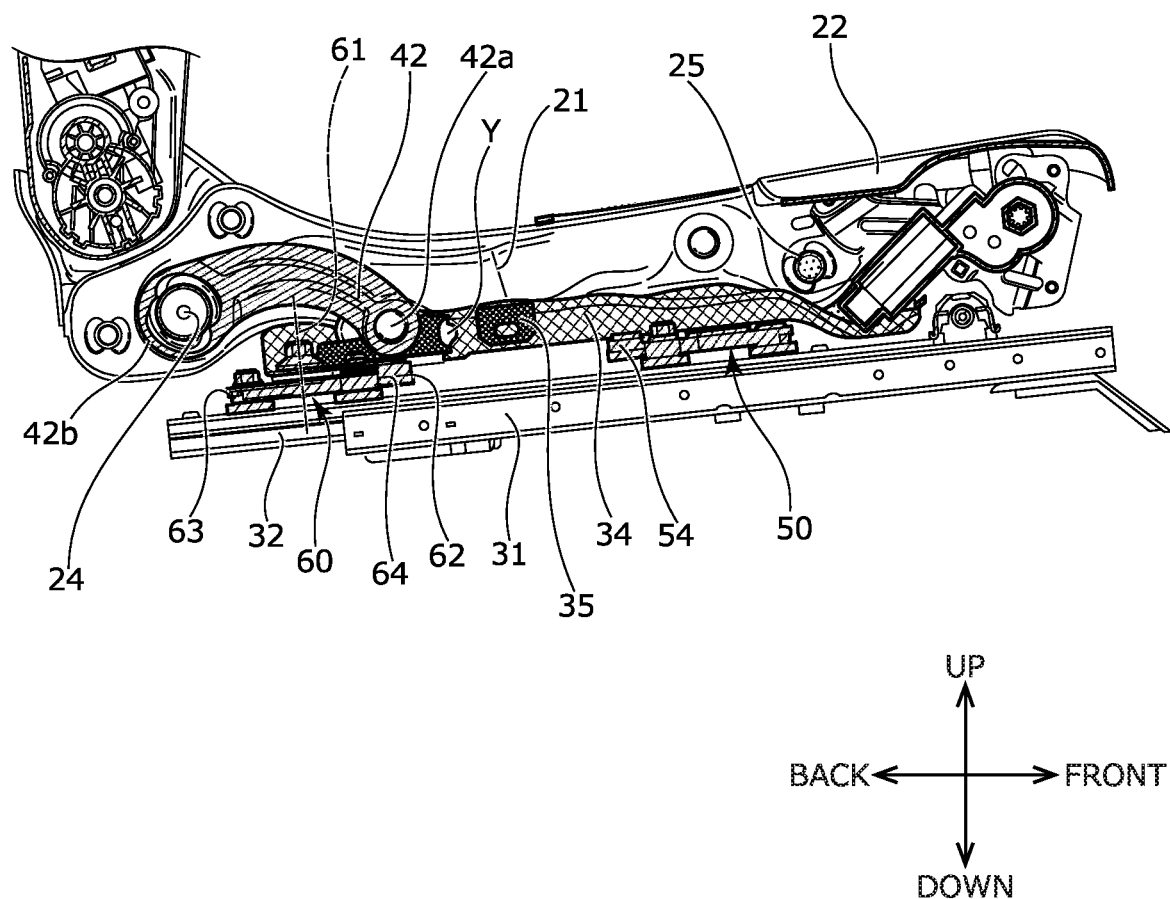
FIG. 12B is a schematic side view of the seat frame when the seat cushion of the vehicle seat is located at the lowermost position, when viewed from the inside.
Figure 13:
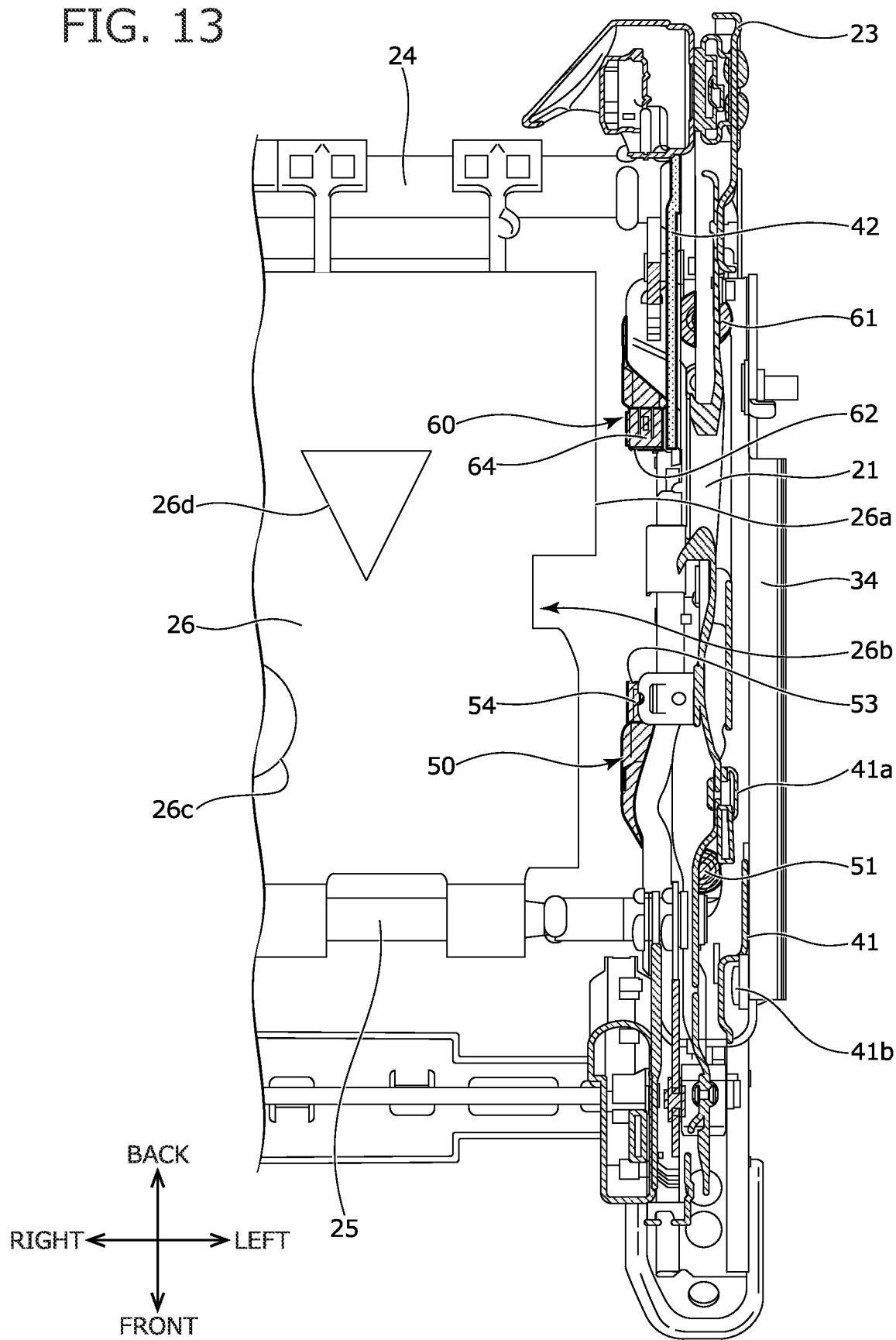
FIG. 13 is a partial cross-sectional view of the seat cushion frame of the vehicle seat when viewed from above.

The bottom wall 35a of the second link support bracket 35 is overlapped on the bottom wall 34a of the first link support bracket 34 to be welded at a welded portion Y (FIGS. 5, 10A and 10B).

(Height Adjustment Mechanism 40)

The height adjustment mechanism 40 adjusts the height of the seat cushion S2 by rotation of the rotation links. Two rotation links are arranged on each of the right and left sides. Specifically, two rotation links are arranged above each of the pair of right and left slide rail mechanisms 30. The two rotation links are separated from each other in the front to back direction (that is, the extending direction of the lower rail 31).

Front rotation links correspond to first link members, and are referred to as the front links 41 below. Rotation links located rearward of the front rotation links correspond to second link members, and are referred to as the rear links 42 below. The front links 41 are positioned closer to the front side connecting pipe 25 than the rear links 42 in the front to back direction. In other words, the front side connecting pipe 25 is positioned closer to the front links 41 than the rear links 42.

Figure 9:
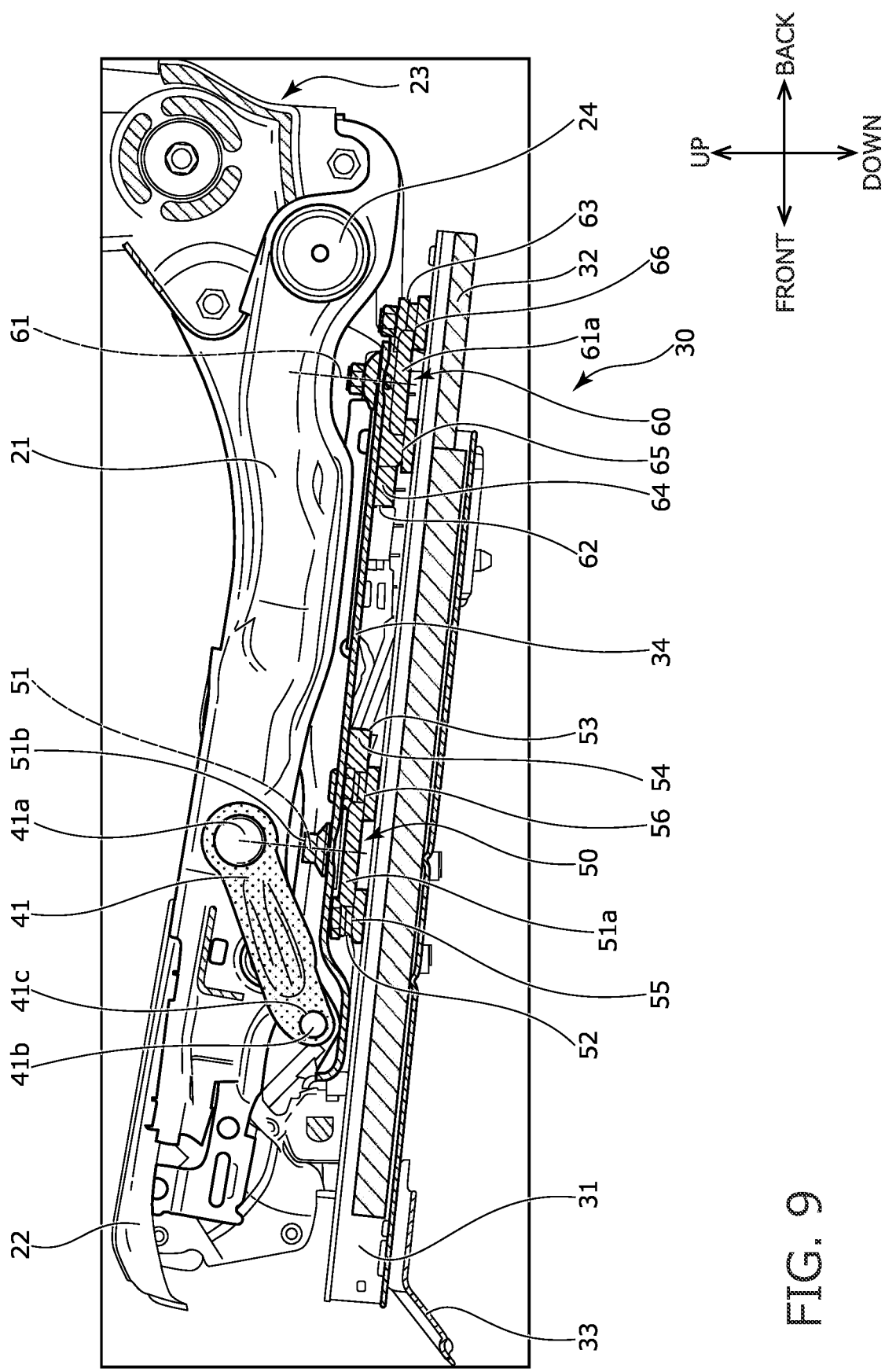
FIG. 9 is a cross-sectional view taken along the line A-A of FIG. 2.

Each of the rotation links is made of metal plate material and is pressed into a predetermined shape. Ribs recessed inward in the seat width direction are formed on the surfaces of the front links 41 so as to extend between first rotation shafts 41a and the second rotation shafts 41b (FIG. 9). Further, ribs recessed outward in the seat width direction are formed on the surfaces of the rear links 42 so as to extend between the rear link rotation shafts 42a and rear end portions 42b (FIGS. 10A and 10B).

A configuration of the height adjustment mechanism 40 will be described below with reference to FIGS. 8 to 12B. In the height adjustment mechanism 40, both the front links 41 and the rear links 42, which are rotation links, are rotatably supported with respect to the seat cushion S2 and the upper rail 32.

Figure 8:
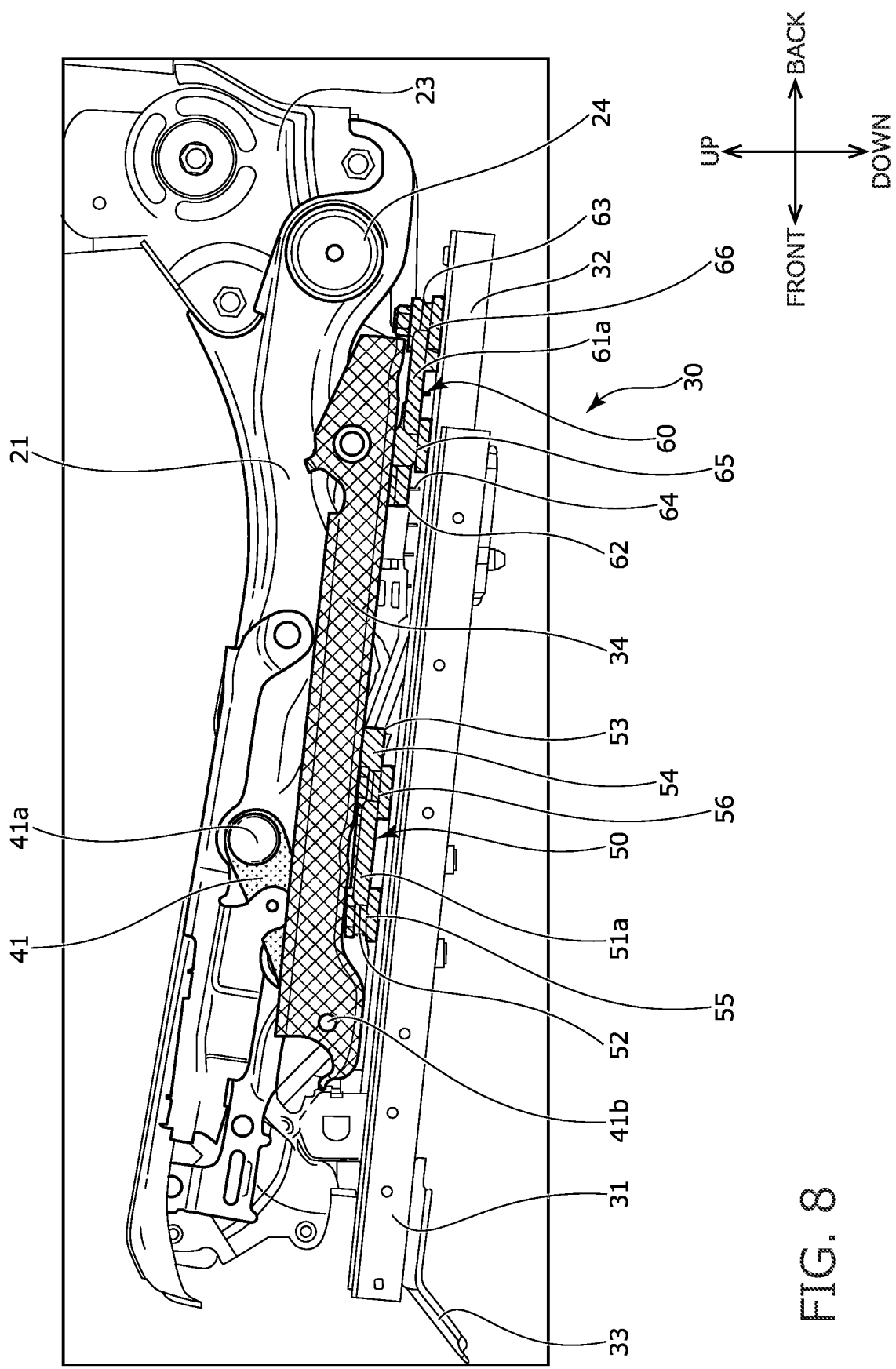
FIG. 8 is a side view of the seat cushion frame of the vehicle seat.

Specifically, the front link 41 is rotatably supported with respect to the first link support bracket 34 via a pivot pin so as to overlap with the front link hole 34d at the second rotation shaft 41b at its lower end portion (FIGS. 8 and 9).

Further, the rear link 42 is rotatably supported with respect to the second link support bracket 35 via a pivot pin so as to overlap with the rear link hole 35c at the rear link rotation shaft 42a at its lower end portion (FIGS. 10A and 10B).

In addition, an upper end portion of the front link 41 is rotatably supported at the first rotation shaft 41a via a pivot pin, at a portion slightly forward of the center portion of the seat cushion side frame 21 in the front to back direction of the seat (FIGS. 8 and 9). Furthermore, the rear end portion 42b of the rear link 42 is rotatably supported at the rear side connecting pipe 24 at the rear end portion of the seat cushion side frame 21 (FIGS. 10A and 10B).

Here, the support structure of an upper end portion of the rear link 42 will be described in detail. The upper end portion of the rear link 42 has a substantially sector in a side view as shown in FIG. 10B, and a through hole is formed in the central portion thereof. The end portion of the rear side connecting pipe 24 is fitted and welded to the through hole, as shown in FIG. 10B.

The rear side connecting pipe 24 is supported by the seat cushion side frames 21 so as to be rotatable relative to the seat cushion side frames 21. Thus, the upper end portion of the rear link 42 is rotatable relative to the seat cushion side frames 21.

In this way, the front link 41 and the rear link 42, as well as, the link support brackets (the first link support bracket 34 and the second link support bracket 35) fixed to the upper rail 32, and the seat cushion side frame 21, constitute a four-bar linkage. The front link 41 or the rear link 42 can be rotated with respect to the seat cushion side frame 21 by an electric or manual actuator (not shown) to change the height of the seat cushion S2.

Specifically, when one of the front link 41 and the rear link 42 rotates, in a manner following this, the other of the rotation links rotates in the same direction. At this time, each of the rotation links rotates so as to rotate together with the seat cushion frame 20 (in other words, rotate together with the seat cushion S2). As a result, the seat cushion frame 20 (that is, the position of the seat cushion S2) moves up and down between the uppermost position shown in FIGS. 11A and 11B and the lowermost position shown in FIGS. 12A and 12B to adjust the height of the seat cushion S2.

(Load Detection Sensor)

In the vehicle seat S of the present embodiment, a load detection sensor that detects the load applied to the vehicle seat S is attached to the upper surface of the upper rail 32 of the slide rail mechanism 30 as a base by fastening members (bolts and nuts). More specifically, the front load detection sensor 50 as a first load detection sensor is attached to a front part of the upper rail 32 by a first front side fastening member 55 and a first rear side fastening member 56, and a rear load detection sensor 60 as a second load detection sensor is attached to a rear part of the upper rail 32 by a second front side fastening member 65 and a second rear side fastening member 66. The front load detection sensor 50 and the rear load detection sensor 60 are conventionally known strain sensors.

The front load detection sensor 50 and the rear load detection sensor 60 may be provided on at least one of a pair of upper rails 32 separated from each other in the seat width direction. When the vehicle seat S does not include the slide rail mechanisms 30, the front load detection sensor 50 and the rear load detection sensor 60 are directly attached to a vehicle body floor (not shown) as a base.

As shown in FIG. 9, the front load detection sensor 50 includes the first sensor shaft 51, to which a load is applied from above, between a first sensor front end 52 located at the front and a first sensor rear end 53 located at the rear. The front load detection sensor 50 includes, at the first sensor rear end 53, a first coupler (a sensor connector) for connecting to an external electronic device (an electronic control unit).

When the load of the occupant seated on the vehicle seat S is applied to a first flexure element 51a, which is a sensor substrate, via the first sensor shaft 51, deflection is generated in the first flexure element 51a. The front load detection sensor 50 is configured to measure the load of the occupant seated on the vehicle seat S as the deflection generated in the first flexure element 51a.

As shown in FIG. 9, the rear load detection sensor 60 includes a second sensor shaft 61, to which a load is applied from above, between a second sensor front end 62 located at the front and a second sensor rear end 63 located at the rear. The rear load detection sensor 60 includes, at the second sensor rear end 63, a second coupler 64 (a sensor connector) for connecting to an external electronic device (an electronic control unit).

When the load of the occupant seated on the vehicle seat S is applied to a second flexure element 61a, which is a sensor substrate, via the second sensor shaft 61, deflection is generated in the second flexure element 61a. The rear load detection sensor 60 is configured to measure the load of the occupant seated on the vehicle seat S as the deflection generated in the second flexure element 61a.

As shown in FIGS. 5, 8 and 9, the first flexure element 51a is located on a lower surface of the bottom wall 34a of the first link support bracket 34, and an upper end portion 51b of the first sensor shaft 51 is exposed upward from the first shaft hole 34e of the bottom wall 34a of the first link support bracket 34. Further, the second flexure element 61a is located on the lower surface of the bottom wall 34a of the first link support bracket 34, and an upper end portion of the second sensor shaft 61 is exposed upward from the second shaft hole 34f of the bottom wall 34a of the first link support bracket 34.

With such a configuration, in the vehicle seat S according to the present embodiment, the link support brackets (the first link support brackets 34 and the second link support brackets 35) appropriately support the rotation links (the front links 41 and the rear links 42), and the load of the occupant seated on the vehicle seat S is efficiently applied to the first flexure element 51a via the first sensor shaft 51.

(About the Positional Relationship between Members)

In the vehicle seat S according to the present embodiment, the respective components are arranged in an appropriate positional relationship as described below, and therefore, even though the height adjustment mechanism 40 and the load detection sensor are provided, an increase in size in the height direction and the width direction is prevented.

The front load detection sensor 50 is located at a position different from the second rotation shaft 41b of the front link 41 in the front to back direction of the seat (FIG. 9). More specifically, the second rotation shaft 41b of the front link 41 is arranged forward of the first sensor front end 52 of the front load detection sensor 50 (FIG. 9). In this way, in the seat front to back direction, the second rotation shaft 41b of the front link constituting the height adjustment mechanism 40 is arranged at a position different from the front load detection sensor 50 and does not overlap with the front load detection sensor 50, so that the vehicle seat S is prevented from being increased in size in the height direction.

Further, the first sensor shaft 51 of the front load detection sensor 50 is arranged at the same height position as at least a part of the second rotation shaft 41b of the front link 41 in the up to down direction of the seat (FIG. 9). Thus, since the second rotation shaft 41b and the first sensor shaft 51 are arranged at the same height position, the vehicle seat S is prevented from being increased in size in the height direction.

Further, as shown in FIG. 9, an upper end portion 41c of the second rotation shaft 41b of the front link 41 is arranged below the upper end portion 51b of the first sensor shaft 51 in the up to down direction of the seat, and the vehicle seat S is prevented from being increased in size in the height direction.

Further, as shown in FIG. 9, when the seat cushion S2 is located at the lowermost position, at least a part of the front load detection sensor 50 is arranged at the same height position as the rear side connecting pipe 24 of the seat cushion frame 20 in the up to down direction of the seat, and the vehicle seat S is prevented from being increased in size in the height direction.

Further, the seat cushion side frame 21 is arranged between the front link 41 and the rear link 42 in the seat width direction (FIGS. 9 and 10), and the first sensor shaft 51 is arranged between the front link 41 and the rear link 42 in the seat width direction. (FIGS. 3 and 5). According to such a configuration, the vehicle seat S is prevented from being increased in size in the width direction.

Figure 14:
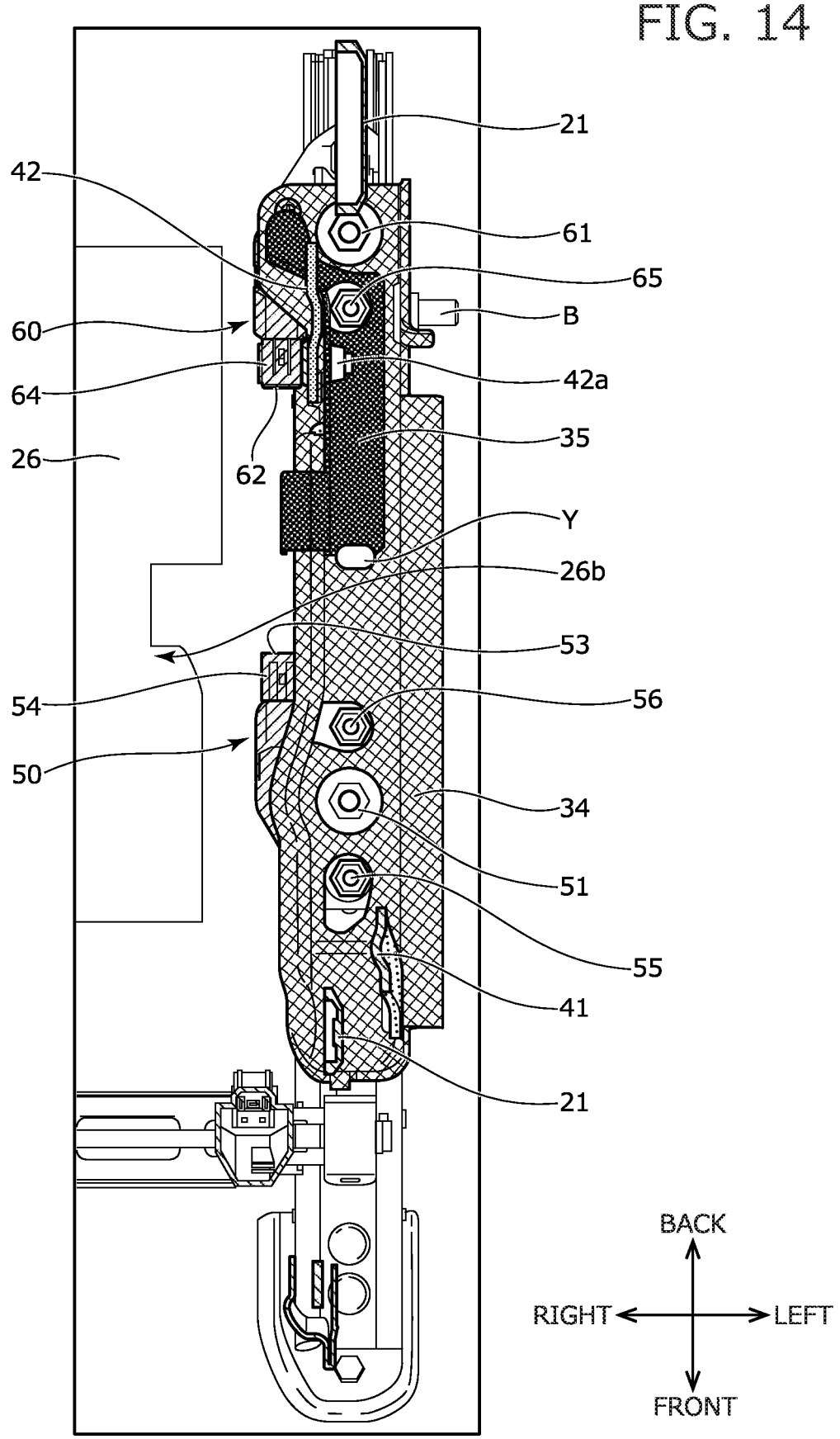
FIG. 14 is a top view showing a configuration at and near support brackets of the seat cushion frame of the vehicle seat.

Further, the second sensor shaft 61 of the rear load detection sensor 60 is arranged between the front link 41 and the rear link 42 in the seat width direction (FIGS. 3, 5, and 14), and the vehicle seat S is prevented from being increased in size in the width direction.

Further, the rear link 42 is arranged between the seat cushion side frame 21 and the second coupler 64 of the rear load detection sensor 60 in the seat width direction (FIG. 15). Thus, in the seat width direction, the rear link 42 is provided within the range between the seat cushion side frame 21 and the second coupler 64, and the vehicle seat S is made more compact accordingly.

Further, the second coupler 64 of the rear load detection sensor 60 is arranged at the same position as the rear link 42 in the front to back direction of the seat (FIG. 10B), which is a compact arrangement. Further, as shown in FIG. 10B, the rear link rotation shaft 42a of the rear link 42 is arranged at the same height position as the second sensor shaft 61 in the up to down direction of the seat.

Further, the front link 41 and the rear link 42 are attached to the link support brackets (the first link support bracket 34 and the second link support bracket 35), and the front load detection sensor 50 and the rear load detection sensor 60 are attached to the link support brackets (FIG. 5). Here, as shown in FIG. 8, the first link support bracket 34 is bent upward as it goes rearward from the front end, and is separated from the upper rail 32 of the slide rail mechanism 30 between the attachment position of the front load detection sensor 50 and the attachment position of the second load detection sensor 60 (in other words, between the first sensor shaft 51 and the second sensor shaft 61). According to such a configuration, the number of components constituting the vehicle seat S is reduced, and the rigidity of the link support bracket itself is improved.

Further, the recessed portion 26b provided at the side portion 26a of the pressure receiving member 26 is arranged between the front load detection sensor 50 and the rear load detection sensor 60 in the front to back direction of the seat. Thus, the recess of the pressure receiving member 26 is compactly arranged in the front to back direction of the seat, so that the rigidity of the pressure receiving member 26 is prevented from being reduced.

<Modification>

Figure 16:
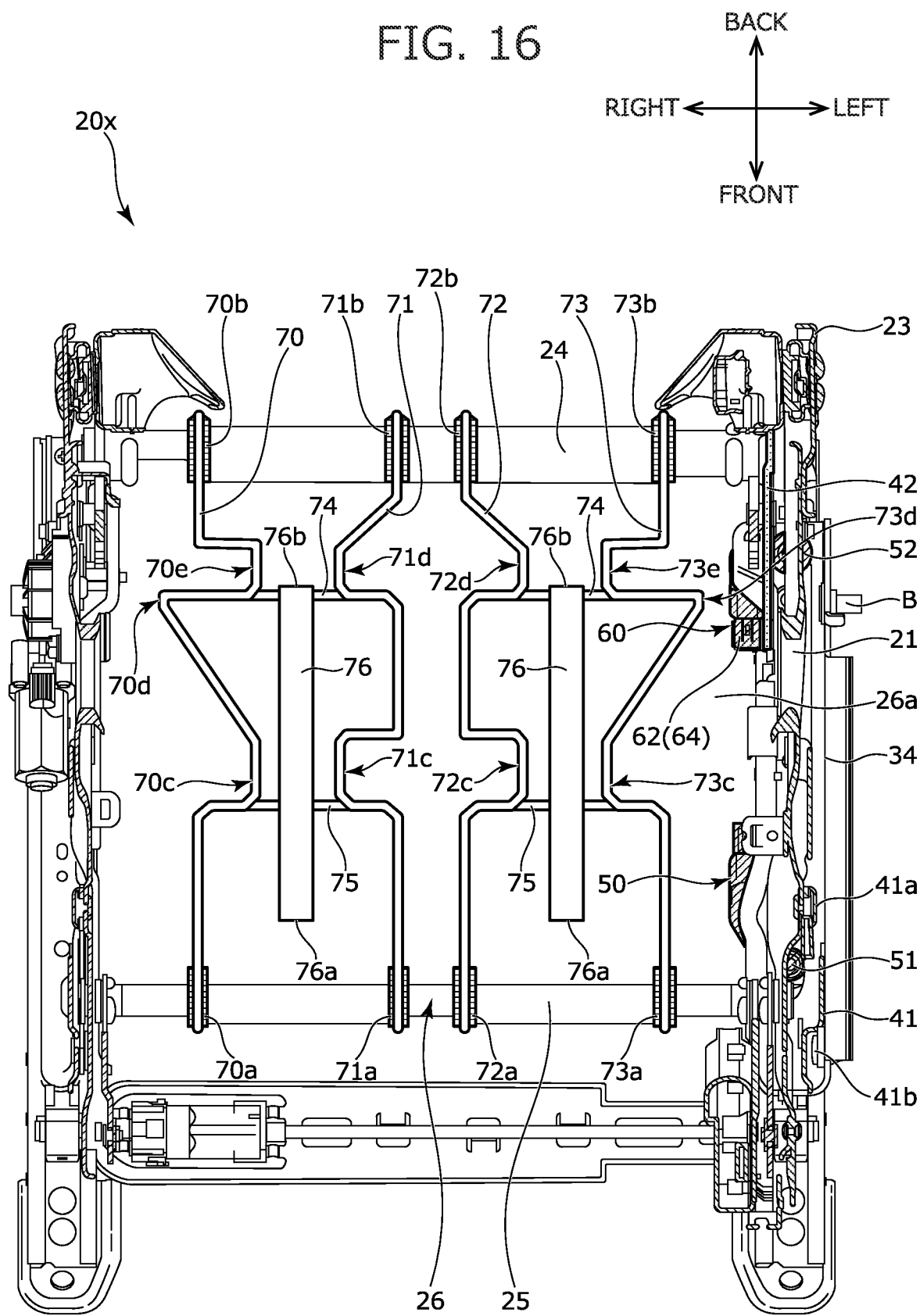
FIG. 16 is a partial cross-sectional view of a seat cushion frame of a vehicle seat according to a modification when viewed from above.

The present invention is not limited to the embodiment described above. FIG. 16 is a partial cross-sectional view of a seat cushion frame 20x of the vehicle seat S according to a modification when viewed from above. As shown in FIG. 16, wire springs 70, 71, 72, 73 are suspended between the rear side connecting pipe 24 and the front side connecting pipe 25 of the seat cushion frame 20x.

The wire spring 70 includes a spring recessed portion 70c, a spring protruded portion 70d, and a spring recessed portion 70e in order from front to back between a front end 70a and a rear end 70b. Further, the wire spring includes a spring recessed portion 71c and a spring recessed portion 71d in order from front to back between a front end 71a and a rear end 71b. Further, the wire spring includes a spring recessed portion 72c and a spring recessed portion 72d in order from front to back between a front end 72a and a rear end 72b. Further, the wire spring includes a spring recessed portion 73c, a spring protruded portion 73d, and a spring recessed portion 73e in order from front to back between a front end 73a and a rear end 73b.

As shown in FIG. 16, the spring protruded portion 73d of the wire spring 73 is arranged to face the second coupler 64 (the sensor connector) arranged at the second sensor front end 62 of the rear load detection sensor 60 in the seat width direction. Further, the spring protruded portion 73d and the second coupler 64 (the sensor connector) are arranged so as not to overlap with each other in the up to down direction of the seat.

According to such an arrangement, compared to the case where the spring recessed portion 73c or the spring recessed portion 73e is arranged to face the second coupler 64 in the seat width direction, the area supporting the occupant with the wire spring 73 can be increased in the seat width direction.

The wire spring 70 and the wire spring 71 are connected to each other at the rear through a rear connecting member 74 and are connected to each other at the front through a front connecting member 75. The rear connecting member 74 and the front connecting member 75 are connected to each other through resin members 76 extending in the front to back direction of the seat. The resin members 76 have a certain degree of elasticity, and have front ends 76a and rear ends 76b. In the resin members 76, the front ends 76a are free ends, and the rear ends 76b are fixed ends.

The resin members 76 extend forward from a position rearward of the second coupler 64 (the sensor connector) arranged at the second sensor front end 62 of the rear load detection sensor 60 and extend beyond the front connecting member 75. Thus, the resin members 76 are arranged long in the front to back direction of the seat.

Figure 17:
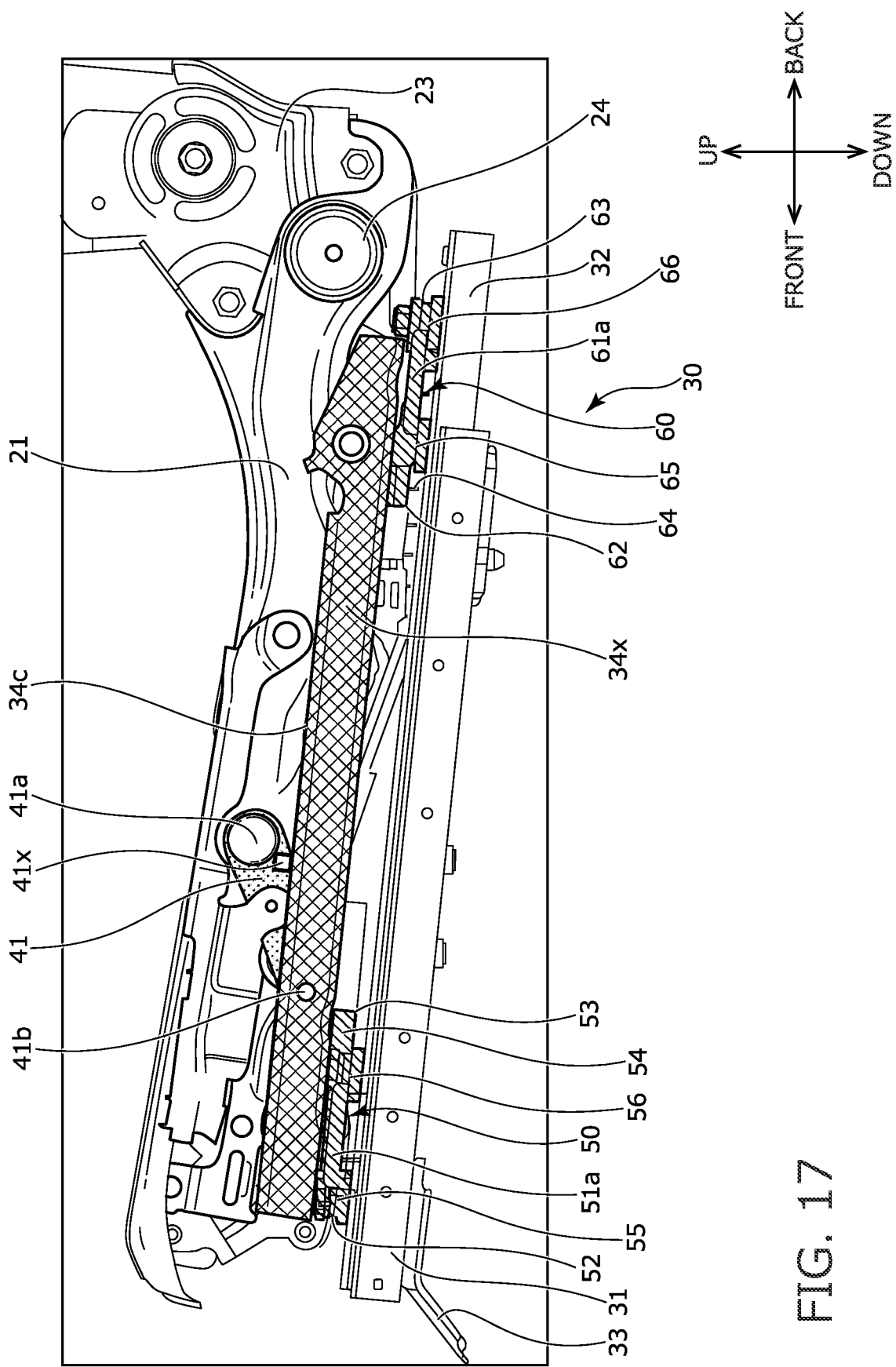
FIG. 17 is a side view of a seat cushion frame of a vehicle seat according to a modification.

FIG. 17 is a side view of a seat cushion frame of a vehicle seat according to another modification. As shown in FIG. 17, a flange 41x is formed as a stopper portion that restricts the rotation range of the front link 41 at the rear end portion of the front link 41 on the side of the first rotation shaft 41a.

When the seat cushion S2 is located at the lowest position, the flange 41x is in contact with an upper surface (a contact portion) of the outer wall 34c of a first link support bracket 34x. In this manner, the flange 41x restricts the front link 41 from rotating further downward. In addition, the protrusion amount of the flange 41x is set such that the flange 41x protrudes up to the inner side of the outer end portion of the upper surface (the contact portion) of the outer wall 34c of the first link support bracket 34x in the seat width direction, so that the flange 41x is compactly formed.

The upper surface of the outer wall 34c of the first link support bracket 34x protrudes upward or is recessed downward so as to function as a receiving portion for the flange 41x. Furthermore, rubber as an elastic member may be attached to the upper surface of the outer wall 34c of the first link support bracket 34.

As shown in FIG. 17, the front load detection sensor 50 may be arranged forward of the second rotation shaft 41b of the front link 41.

When the seat cushion S2 is located at the lowermost position, the first rear side fastening member 56 as a rear side attachment member of the front load detection sensor 50 is arranged forward of the second rotation shaft 41*b*, and the front load detection sensor 50 is overall arranged forward of the second rotation shaft 41*b*. With such a configuration, when the front link 41 is provided with the flange 41*x* as the stopper portion, the interference between the front load detection sensor 50 and the front link 41, and an increase in size of seat structure in the up to down direction in design can be prevented.

REFERENCE SIGNS LIST

S vehicle seat (conveyance seat)
S1 seat back
S2 seat cushion
S3 headrest
R skin material
U cushion pad
L operating lever
F seat frame
10 seat back frame
11 upper frame
12 seat back side frame
13 lower member frame
20, 20*x* seat cushion frame
21 seat cushion side frame (side frame)
22 pan frame
23 connecting bracket
24 rear side connecting pipe (connecting member)
25 front side connecting pipe
26 pressure receiving member
  26*a* side portion
  26*b* recessed portion
  26*c* round hole
  26*d* triangle hole
30 slide rail mechanism (base)
31 lower rail
32 upper rail
33 foot
34, 34*x* first link support bracket (link support bracket)
  34*a* bottom wall
  34*b* inner wall
  34*c* outer wall (bent wall portion)
  34*d* front link hole
  34*e* first shaft hole
  34*f* second shaft hole
  34*g* rear hole
  34*h* rising portion
35 second link support bracket (link support bracket)
  35*a* bottom wall
  35*b* inner wall
  35*c* rear link hole
  35*d* nut hole
  35*e* notched portion
40 height adjustment mechanism
41 front link (first link member)
  41*a* first rotation shaft
  41*b* second rotation shaft
  41*c* upper end portion
  41*x* flange
42 rear link (second link member)
  42*a* rear link rotation shaft (third rotation shaft)
  42*b* rear end portion
50 front load detection sensor (first load detection sensor)
  51 first sensor shaft
  51*a* first flexure element
  51*b* upper end portion
  52 first sensor front end
  53 first sensor rear end
  54 first coupler
  55 first front side fastening member
  56 first rear side fastening member
60 rear load detection sensor (second load detection sensor)
  61 second sensor shaft
  61*a* second flexure element
  62 second sensor front end
  63 second sensor rear end
  64 second coupler
  65 second front side fastening member
  66 second rear side fastening member
B buckle support bracket attachment portion
Y welded portion
70, 71, 72, 73 wire spring (pressure receiving member)
  70*a*, 71*a*, 72*a*, 73*a* front end
  70*b*, 71*b*, 72*b*, 73*b* rear end
  70*c*, 71*c*, 72*c*, 73*c* spring recessed portion
  70*d*, 73*d* spring protruded portion
  70*e*, 71*d*, 72*d*, 73*e* spring recessed portion
74 rear connecting member
75 front connecting member
76 resin member
  76*a* front end
  76*b* rear end

What is claimed is:

1. A conveyance seat, comprising:
a seat cushion provided with a seat cushion frame;
a first link member configured to adjust a height of the seat cushion with respect to a base that is a slide rail or a vehicle body floor; and
a first link support bracket,
wherein
the seat cushion frame includes a pair of side frames separated from each other in a width direction of the conveyance seat,
the first link member includes a first rotation shaft configured to be rotatable with respect to the seat cushion frame and a second rotation shaft configured to be rotatable with respect to the base,
the first link member is attached to the first link support bracket at the second rotation shaft,
the first link support bracket includes a bent wall portion that is bent above the second rotation shaft,
the bent wall portion is aligned with the first link member in the width direction of the conveyance seat, and
the bent wall portion is bent in an inverted U shape in the width direction of the conveyance seat.

2. The conveyance seat according to claim 1, wherein an upper portion of the second rotation shaft is covered with the bent wall portion.

3. The conveyance seat according to claim 1, wherein the bent wall portion extends in a front to back direction of the conveyance seat, and
a length of the bent wall portion is greater than a length of the first link member.

4. The conveyance seat according to claim 1, wherein the first link support bracket includes a rising portion at an end portion of the first link support bracket in a front to back direction of the conveyance seat, and
the bent wall portion is connected to the rising portion.

5. The conveyance seat according to claim 1, further comprising
a second link member connected with the base at a third rotation shaft at a position rearward of the first link member and configured to adjust the height of the seat cushion, wherein a rear end of the bent wall portion in a front to back direction of the conveyance seat is disposed in front of the third rotation shaft.

6. The conveyance seat according to claim 1, further comprising
   a second link member connected with the base through a third rotation shaft at a position rearward of the first link member and configured to adjust the height of the seat cushion; and
   a second link support bracket to which the second link member is attached, wherein
   the second link support bracket is overlapped with the first link support bracket.

7. The conveyance seat according to claim 1, wherein
   the first link support bracket includes a seatbelt buckle support bracket attachment portion, and
   a rear end of the bent wall portion in a front to back direction of the conveyance seat is disposed in front of the seatbelt buckle support bracket attachment portion.

8. The conveyance seat according to claim 1, further comprising
   a plate-shaped pressure receiving member suspended on the seat cushion frame, wherein
   a front end of the bent wall portion in a front to back direction of the conveyance seat is located in front of a front end of the pressure receiving member.

9. The conveyance seat according to claim 1, further comprising
   a plate-shaped pressure receiving member suspended on the seat cushion frame; and
   a recessed portion recessed inward and formed at a side portion of the pressure receiving member in the width direction of the conveyance seat, wherein
   the bent wall portion and the recessed portion are located at a same position in a front to back direction of the conveyance seat.

10. A method for manufacturing a conveyance seat, wherein the conveyance seat comprises a seat cushion having a seat cushion frame including a pair of side frames, a first link member configured to adjust a height of the seat cushion with respect to a base that is a slide rail or a vehicle body floor, and a first link support bracket, the method comprising:
    arranging the pair of the side frames to be separated from each other in a width direction of the conveyance seat; and
    rotatably attaching the first link member to the seat cushion frame at a first rotation shaft and to the first link support bracket at a second rotation shaft, wherein
    the first link support bracket includes a bent wall portion that is bent above the second rotation shaft,
    the bent wall portion is aligned with the first link member in the width direction of the conveyance seat, and
    the bent wall portion is bent in an inverted U shape in the width direction of the conveyance seat.

11. The method according to claim 10, wherein
    an upper portion of the second rotation shaft is covered with the bent wall portion.

12. The method according to claim 10, wherein
    the bent wall portion extends in a front to back direction of the conveyance seat, and
    a length of the bent wall portion is greater than a length of the first link member.

13. The method according to claim 10, wherein
    the first link support bracket includes a rising portion at an end portion of the first link support bracket in a front to back direction of the conveyance seat, and
    the bent wall portion is connected to the rising portion.

14. The method according to claim 10, wherein
    the conveyance seat further comprises a second link member connected with the base at a third rotation shaft at a position rearward of the first link member and configured to adjust the height of the seat cushion, and
    a rear end of the bent wall portion in a front to back direction of the conveyance seat is disposed in front of the third rotation shaft.

15. The method according to claim 10, wherein
    the conveyance seat further comprises
        a second link member connected with the base through a third rotation shaft at a position rearward of the first link member and configured to adjust the height of the seat cushion, and
        a second link support bracket to which the second link member is attached, and the second link support bracket is overlapped with the first link support bracket.

16. The method according to claim 10, wherein
    the first link support bracket includes a seatbelt buckle support bracket attachment portion, and
    a rear end of the bent wall portion in a front to back direction of the conveyance seat is disposed in front of the seatbelt buckle support bracket attachment portion.

17. The method according to claim 10, wherein
    the conveyance seat further comprises a plate-shaped pressure receiving member suspended on the seat cushion frame, and
    a front end of the bent wall portion in a front to back direction of the conveyance seat is located in front of a front end of the pressure receiving member.

18. The conveyance seat according to claim 10, wherein
    the conveyance seat further comprises
        a plate-shaped pressure receiving member suspended on the seat cushion frame, and
        a recessed portion recessed inward and formed at a side portion of the pressure receiving member in the width direction of the conveyance seat, and
    the bent wall portion and the recessed portion are located at a same position in a front to back direction of the conveyance seat.

19. A conveyance seat, comprising:
    a seat cushion provided with a seat cushion frame;
    a first link member configured to adjust a height of the seat cushion with respect to a base that is a slide rail or a vehicle body floor;
    a first link support bracket;
    a second link member connected with the base through a third rotation shaft at a position rearward of the first link member and configured to adjust the height of the seat cushion; and
    a second link support bracket to which the second link member is attached,
    wherein
    the seat cushion frame includes a pair of side frames separated from each other in a width direction of the conveyance seat,
    the first link member includes a first rotation shaft configured to be rotatable with respect to the seat cushion frame and a second rotation shaft configured to be rotatable with respect to the base, the first link member is attached to the first link support bracket at the second rotation shaft, the first link support bracket includes a bent wall portion that is bent above the second rotation shaft, the bent wall portion is aligned with the first link member in the width direction of the conveyance seat, and the second link support bracket is overlapped with the first link support bracket.

20. The conveyance seat according to claim 19, wherein the bent wall portion is bent in an inverted U shape in the width direction of the conveyance seat, and an upper portion of the second rotation shaft is covered with the bent wall portion.

\* \* \* \* \*